United States Patent
Oka et al.

(10) Patent No.: US 12,498,154 B2
(45) Date of Patent: Dec. 16, 2025

(54) AIR PURGE DEVICE

(71) Applicant: MITSUBISHI HEAVY INDUSTRIES THERMAL SYSTEMS, LTD., Tokyo (JP)

(72) Inventors: Nobuki Oka, Tokyo (JP); Ryo Kamito, Tokyo (JP); Yoshiaki Ito, Tokyo (JP); Taichi Yoshii, Tokyo (JP); Tatsuo Ishiguro, Tokyo (JP); Yoshie Togano, Tokyo (JP); Norihisa Horaguchi, Tokyo (JP); Masahiko Nagai, Tokyo (JP); Naoya Miyoshi, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 190 days.

(21) Appl. No.: 18/277,716

(22) PCT Filed: Feb. 18, 2022

(86) PCT No.: PCT/JP2022/006522
§ 371 (c)(1),
(2) Date: Aug. 17, 2023

(87) PCT Pub. No.: WO2022/176969
PCT Pub. Date: Aug. 25, 2022

(65) Prior Publication Data
US 2024/0125527 A1    Apr. 18, 2024

(30) Foreign Application Priority Data
Feb. 19, 2021    (JP) .................................. 2021-025493

(51) Int. Cl.
*F25B 43/04*    (2006.01)

(52) U.S. Cl.
CPC ........ *F25B 43/043* (2013.01); *F25B 2400/01* (2013.01); *F25B 2700/195* (2013.01); *F25B 2700/21163* (2013.01)

(58) Field of Classification Search
CPC ............ F25B 2400/01; F25B 2700/195; F25B 2700/21161; F25B 2700/21163; F25B 43/043; F25B 49/02
See application file for complete search history.

(56) References Cited

U.S. PATENT DOCUMENTS

| | | | |
|---|---|---|---|
| 5,032,148 A | | 7/1991 | Baker et al. |
| 5,392,639 A | * | 2/1995 | Manz ..................... G01N 25/00 73/61.76 |

(Continued)

FOREIGN PATENT DOCUMENTS

| | | |
|---|---|---|
| JP | 5-57125 A | 3/1993 |
| JP | 7-49159 A | 2/1995 |

(Continued)

OTHER PUBLICATIONS

International Search Report for International Application No. PCT/JP2022/006522, dated Apr. 5, 2022, with an English translation.

(Continued)

*Primary Examiner* — Henry T Crenshaw
(74) *Attorney, Agent, or Firm* — BIRCH, STEWART, KOLASCH & BIRCH, LLP

(57) ABSTRACT

An a purge device that includes an air purge pipe connected to a condenser and configured to extract a mixed gas containing a refrigerant gas and air from the condenser; a separation film provided to the air purge pipe and configured to separate, by a pressure difference, air from the mixed gas extracted by the air purge pipe; an exhaust pipe configured to externally guide a gas containing air separated by the separation film; a first valve provided to the exhaust pipe; a vacuum pump provided downstream of the first valve in the (Continued)

exhaust pipe and configured to externally discharge a gas present inside the exhaust pipe; and a control unit, the control unit activates the vacuum pump, opens the first valve, then closes the first valve to stop permeation of air caused by a pressure difference when detecting that a predetermined amount of air has permeated the separation film.

21 Claims, 19 Drawing Sheets

(56) References Cited

U.S. PATENT DOCUMENTS

| | | | |
|---|---|---|---|
| 2015/0107279 A1* | 4/2015 | Sanhaji | F25B 45/00 62/85 |
| 2016/0175740 A1* | 6/2016 | Stark | B01D 19/0031 96/6 |
| 2016/0214062 A1 | 7/2016 | Roh | |
| 2016/0245408 A1 | 8/2016 | Nohara et al. | |
| 2017/0219260 A1 | 8/2017 | Togano et al. | |
| 2019/0024957 A1 | 1/2019 | Wajima et al. | |
| 2020/0222847 A1* | 7/2020 | Monteith | F25B 43/04 |
| 2021/0364203 A1 | 11/2021 | Ranjan et al. | |

FOREIGN PATENT DOCUMENTS

| | | |
|---|---|---|
| JP | 7-185253 A | 7/1995 |
| JP | 2757610 B2 | 5/1998 |
| JP | 2008-96027 A | 4/2008 |
| JP | 2015-525134 A | 9/2015 |
| JP | 2020-2877 A | 1/2020 |
| JP | 6763742 B2 | 9/2020 |
| WO | WO 2015/020719 A1 | 2/2015 |
| WO | WO 2016/047305 A1 | 3/2016 |
| WO | WO 2017/154934 A1 | 9/2017 |
| WO | WO 2020/117582 A1 | 6/2020 |

OTHER PUBLICATIONS

Written Opinion of the International Searching Authority for International Application No. PCT/JP2022/006522, dated Apr. 5, 2022, with an English translation.

* cited by examiner

AIR PURGE DEVICE

TECHNICAL FIELD

The present disclosure relates to a air purge device.

BACKGROUND ART

In chillers using a refrigerant whose working pressure during operation becomes a negative pressure in some part of a machine (a so-called low-pressure refrigerant), an uncondensable gas such as air from a negative pressure part enters the machine and is retained in a condenser after passing through a compressor or the like. Such a retained uncondensable gas in a condenser deteriorates the condensing performance of a refrigerant in the condenser and reduces the performance as a chiller. Thus, a air purge device is used to extract a refrigerant containing an uncondensable gas from a chiller, discharge the uncondensable gas to outside of the machine, and thereby ensure a certain level of performance.

For example, a air purge device disclosed in Patent Literature 1 is configured such that a gas separation film is attached to the top of the inside of a bleed tank, the bleed tank is separated into the chiller side and the outside air side with respect to the gas separation film as the boundary, the outside air side is depressurized by a vacuum pump, and an uncondensable gas is discharged to the atmosphere.

CITATION LIST

Patent Literature

[PTL 1]
Japanese Patent Application Laid-Open No. 2008-96027

SUMMARY OF INVENTION

Technical Problem

However, there are several types of gas separation films such as, for example, those characterized in being much permeable to an uncondensable gas but also permeable to a certain amount of a refrigerant gas and thus being unable to efficiently separate the refrigerant gas and the uncondensable gas from each other or those characterized in being extremely impermeable to a refrigerant gas but also less permeable to an uncondensable gas.

The use of the former gas separation film will undesirably allow permeation of a small amount of a refrigerant gas along with an uncondensable gas, though the amount of the refrigerant gas is much smaller than that of the uncondensable gas.

The use of the latter gas separation film may result in insufficient discharge of an uncondensable gas. Further, to sufficiently discharge an uncondensable gas in such a case, it is required to increase a partial pressure of the uncondensable gas within the system. However, an increased partial pressure of the uncondensable gas (that is, a higher concentration of the uncondensable gas) causes heat transfer inhibition. One of the parameters indicating a degree of heat transfer inhibition is a terminal temperature difference, and the terminal temperature difference increases as the concentration of the uncondensable gas increases, as illustrated in FIG. 19. Further, to suppress influence of heat transfer inhibition as much as possible, it is required to maintain the increase degree ΔT of the terminal temperature difference within a predetermined temperature (as a general example, 1 K). Thus, it is not preferable to increase the partial pressure of an uncondensable gas. In such a case, although one conceivable method is to increase the area of the gas separation film, this method is also unpreferable when considering reduction in size of the device.

Herein, the "increase degree" means an amount of a rise in temperature [K] with respect to a terminal temperature difference at which the concentration of an uncondensable gas is 0%.

However, by adding a configuration that compensates for disadvantages of respective gas separation films to a air purge device or performing control that compensates for the same, it is possible to selectively use these gas separation films and further efficiently discharge an uncondensable gas by taking advantage of the characteristics of these gas separation films.

The present disclosure has been made in view of such circumstances and intends to provide a air purge device that can discharge an uncondensable gas while suppressing an amount of leakage of a refrigerant to the outside air.

Solution to Problem

To solve the above problem, the air purge device of the present disclosure employs the following solution.

That is, an air purge device according to one aspect of the present disclosure includes: an air purge pipe connected to a condenser and configured to extract a mixed gas containing a refrigerant gas and an uncondensable gas from the condenser; a separation film provided to the air purge pipe and configured to separate, by a pressure difference, an uncondensable gas from the mixed gas extracted by the air purge pipe; an exhaust pipe configured to externally guide a gas containing the uncondensable gas separated by the separation film; a first valve provided to the exhaust pipe; a vacuum pump provided downstream of the first valve in the exhaust pipe and configured to externally discharge a gas present inside the exhaust pipe; and a control unit, and the control unit activates the vacuum pump, opens the first valve, and then closes the first valve to stop permeation of an uncondensable gas caused by a pressure difference when detecting that a predetermined amount of an uncondensable gas permeates the separation film.

Advantageous Effects of Invention

According to the air purge device of the present disclosure, it is possible to discharge an uncondensable gas while suppressing an amount of leakage of a refrigerant to the outside air.

DESCRIPTION OF EMBODIMENTS

First Embodiment

First, a air purge device according to a first embodiment of the present disclosure will be described with reference to the drawings.

[Configuration of Chiller]

Figure 1:
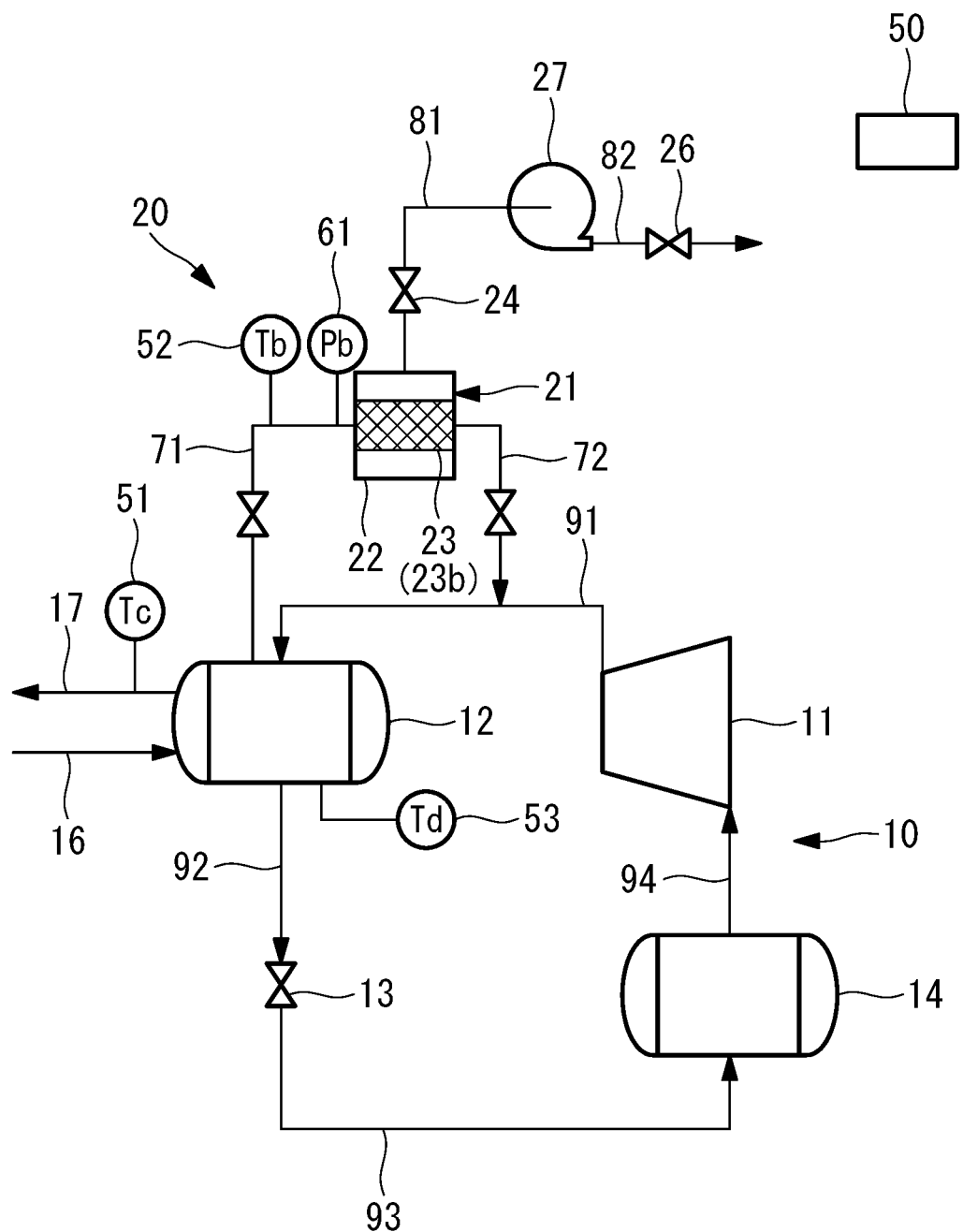
FIG. 1 is a configuration diagram of a air purge device according to a first embodiment of the present disclosure.

The configuration of a chiller 10 will be described. As illustrated in FIG. 1, the chiller 10 has a compressor 11, a condenser 12, an expansion valve 13, an evaporator 14, and refrigerant pipes 91, 92, 93, 94 connecting these apparatuses to each other.

The compressor 11 is an apparatus that compresses a refrigerant. The compressor 11 is driven by a motor (not illustrated). For example, the compressor 11 is a centrifugal type compressor.

The condenser 12 is an apparatus that condenses a high-temperature, high-pressure gas refrigerant compressed by the compressor 11. For example, the condenser 12 is a shell-and-tube type heat exchanger.

A number of cooling medium heat transfer tubes (not illustrated) are inserted in the condenser 12. A cooling medium (for example, cooling water) for cooling the refrigerant flows through the inside of each cooling medium heat transfer tube. A cooling water forward pipe 16 for supplying cooling water to the cooling medium heat transfer tubes and a cooling water return pipe 17 for discharging the cooling water after subjected to heat exchange are connected to the cooling medium heat transfer tubes. The cooling water return pipe 17 is provided with a temperature sensor (a cooling medium temperature sensor 51) that measures a temperature Tc of cooling water after subjected to heat exchange. As the sensor, for example, a resistance thermometer is used.

The expansion valve 13 is an apparatus that causes a liquid refrigerant from the condenser 12 to expand. The expansion valve 13 has an adjustable opening degree, which is set as appropriate in accordance with a specification.

Note that a sub-cooler (not illustrated) may be provided between the condenser 12 and the expansion valve 13. The sub-cooler is an apparatus that supercools a refrigerant condensed by the condenser 12.

The evaporator 14 is an apparatus that evaporates a liquid refrigerant expanded by the expansion valve 13. For example, the evaporator 14 is a shell-and-tube type heat exchanger.

The refrigerant pipe 91 is a pipe connecting the refrigerant outlet of the compressor 11 and the refrigerant inlet of the condenser 12 to each other. The refrigerant pipe 92 is a pipe connecting the refrigerant outlet of the condenser 12 and the expansion valve 13 to each other. The refrigerant pipe 93 is a pipe connecting the expansion valve 13 and the refrigerant inlet of the evaporator 14 to each other. The refrigerant pipe 94 is a pipe connecting the refrigerant outlet of the evaporator 14 and the refrigerant inlet of the compressor 11 to each other.

[Configuration of Air Purge Device]

The configuration of a air purge device 20 will be described. The air purge device 20 is a device that externally releases an uncondensable gas that has entered a refrigerant system of the chiller 10 and has been retained in the condenser 12. For example, the uncondensable gas is air. In the present embodiment, description is provided with the uncondensable gas being air as an example.

A low-pressure refrigerant (for example, R1233zd(E)) is used for the refrigerant. Thus, the low-pressure part such as the evaporator 14 is at a pressure below the atmospheric pressure during operation.

The air purge device 20 is provided between the condenser 12 and the compressor 11. The air purge device 20 has air purge pipes 71, 72, a separation device 21, exhaust pipes 81, 82, and a vacuum pump 27.

The air purge pipe 71 has one end connected to the condenser 12 and the other end connected to the separation device 21. Further, the air purge pipe 72 has one end connected to the separation device 21 and the other end connected to the refrigerant pipe 91 or the compressor 11. Accordingly, the air purge system is configured.

This air purge system is configured to guide a gas extracted from the condenser 12 (a mixed gas of a refrigerant gas and air, which is hereafter simply referred to as "mixed gas") to the separation device 21 via the air purge pipe 71, perform a process described later in the separation device 21, and then return the processed mixed gas to the refrigerant pipe 91 or the compressor 11 upstream of the condenser 12 via the air purge pipe 72.

Note that, since the refrigerant pipe 91 side or the compressor 11 side is at a higher pressure than the inside of the condenser 12 in general during operation of the chiller 10, it appears that the extracted mixed gas does not flow from the condenser 12 toward the refrigerant pipe 91 side or the compressor 11 side.

However, the present embodiment is configured such that the mixed gas flows from the condenser 12 toward the refrigerant pipe 91 side or the compressor 11 side by connecting the air purge pipe 72 to a predetermined portion of the refrigerant pipe 91 or the compressor 11. The detailed configuration will be described later.

This makes it possible to return the mixed gas from which air has been separated (mainly, the refrigerant gas) to the upstream side of the condenser 12.

The air purge pipe 71 is provided with the refrigerant temperature sensor 52 and an upstream pressure sensor 61. The refrigerant temperature sensor 52 measures a temperature Tb upstream of a separation module 23 (separation films 23b) of the separation device 21. The upstream pressure sensor 61 measures a pressure Pb (total pressure) upstream of the separation module 23 (separation films 23b) of the separation device 21.

The exhaust pipe 81 has one end connected to the separation device 21 and the other end connected to the vacuum pump 27. Further, the exhaust pipe 82 has one end connected to the vacuum pump 27 and the other end opened to the atmospheric pressure. Accordingly, an exhaust system is configured.

This exhaust system is configured to release a gas separated in the separation device 21 (a gas, mainly air) to outside of the air purge device 20 via the exhaust pipes 81, 82.

The exhaust pipe 81 is provided with a first valve 24. The first valve 24 can block a flow of a gas flowing in the exhaust pipe 81.

The exhaust pipe 82 is provided with a third valve 26. The third valve 26 can block a flow of a gas flowing in the exhaust pipe 82.

The separation device 21 is a device that separates air from a mixed gas guided via the air purge pipe 71. The separation device 21 has a container 22 and the separation module 23.

The container 22 has a box-like shape, and a space is defined therein. The separation module 23 is accommodated in the inner space.

Figure 2:
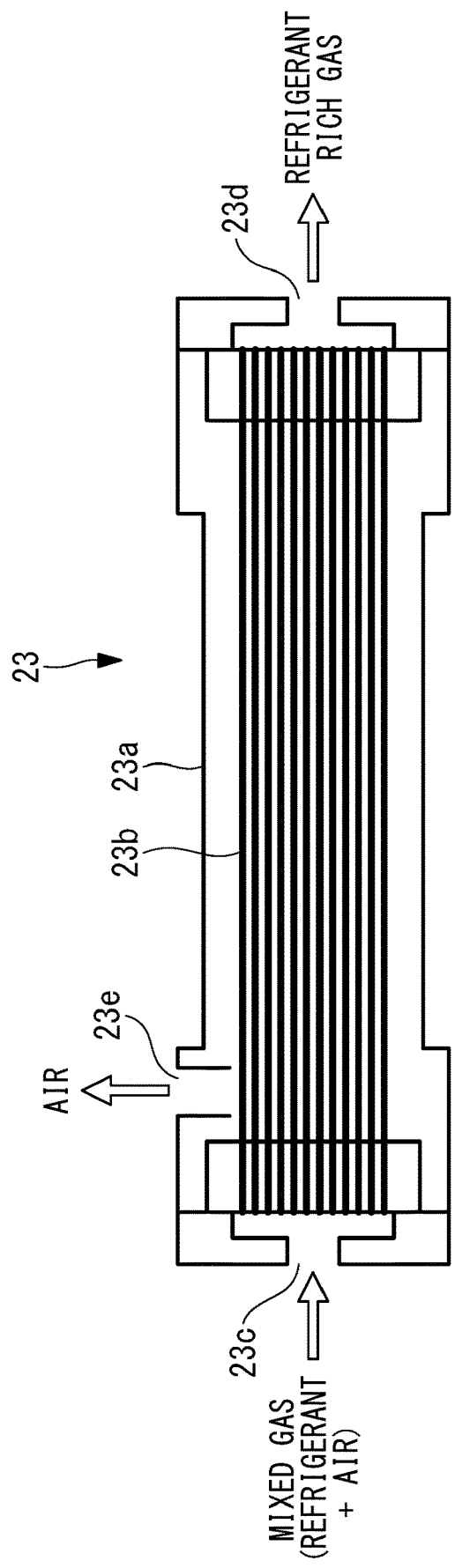
FIG. 2 is a configuration diagram of a separation module.

As illustrated in FIG. 2, the separation module 23 has a cylindrical housing 23a and a number of separation films 23b.

The housing 23a has a air purge inlet 23c, a air purge outlet 23d, and an air outlet 23e.

The air purge inlet 23c communicates with the air purge pipe 71. The air purge outlet 23d communicates with the air purge pipe 72. The air outlet 23e is formed inside the container 22 and communicates with the space.

Figure 3:
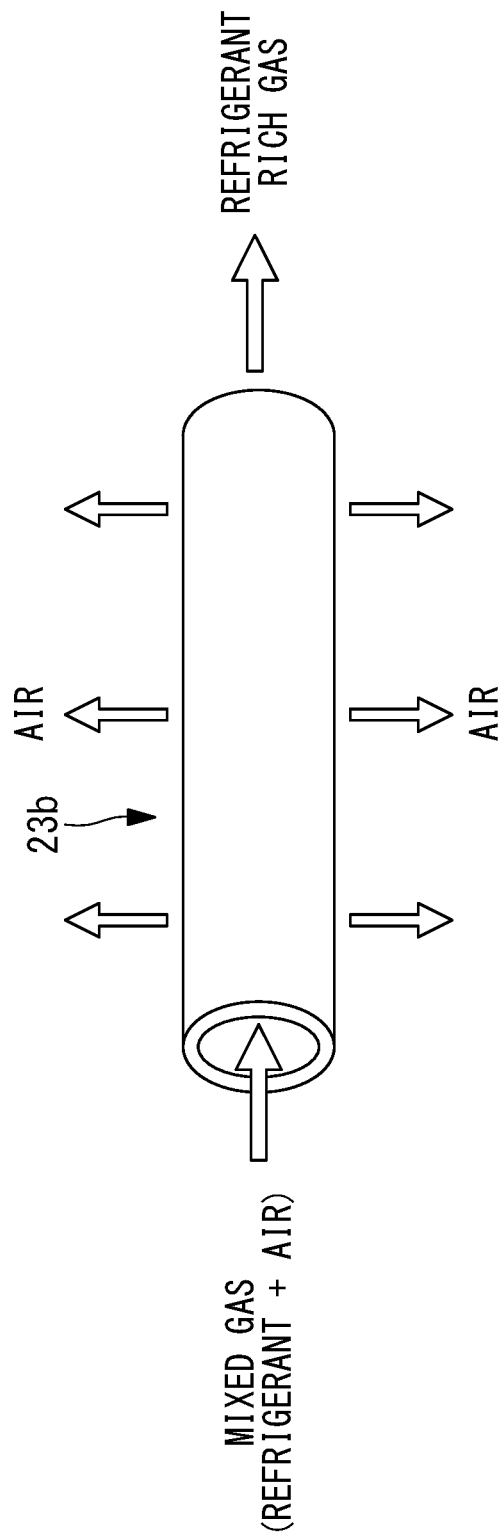
FIG. 3 is configuration diagram of separation films.

As illustrated in FIG. 3, each separation film 23b is formed in a cylindrical shape. The separation films 23b are accommodated in the housing 23a in a bundled state as illustrated in FIG. 2. As illustrated in FIG. 3, a mixed gas guided via the air purge pipe 71 flows inside the cylindrical separation films 23b. At this time, when the pressure is made lower outside than inside of the separation films 23b, the air out of the mixed gas flowing inside permeates the separation films 23b to outside. That is, the separation films 23b separate air from the mixed gas by a pressure difference occurring between the upstream and downstream sides.

Examples of the material of the separation film 23b may be polyimide, zeolite, or the like.

These materials are not materials that are not impermeable at all to a refrigerant gas but are materials having characteristics that allow slight permeation of a refrigerant gas along with air. Note that the permeation rate of a refrigerant gas is much lower than the permeation rate of air.

In the separation device 21 configured as described above, a gas flows as follows.

That is, a mixed gas guided to the separation device 21 via the air purge pipe 71 is guided from the air purge inlet 23c to inside of the housing 23a. The mixed gas guided to the housing 23a flows inside the separation films 23b. At this time, if the pressure outside the separation films 23b (that is, downstream of the separation films 23b) is lower than the pressure inside the separation films 23b (that is, upstream of the separation films 23b), the air contained in the mixed gas flowing inside the separation films 23b permeates the separation films 23b to outside. The air separated from the mixed gas is discharged from the air outlet 23e to the space defined inside the container 22 and guided to the exhaust pipe 81. On the other hand, the mixed gas which has flown inside the separation films 23b and from which the air has been separated (that is, a refrigerant rich gas) is returned from the air purge outlet 23d to the refrigerant pipe 91 or the compressor 11 via the air purge pipe 72.

[Air Discharge Method]

The air purge device 20 configured as described above is controlled as follows, for example, and thereby externally releases air that has entered the refrigerant system of the chiller 10.

Note that operation of each valve, activation/deactivation of a vacuum pump, acquisition of information from each sensor, calculation of each numerical value, or the like described below are performed by the control unit 50.

Herein, for example, the control unit 50 is formed of a central processing unit (CPU), a random access memory (RAM), a read only memory (ROM), a computer readable storage medium, and the like.

Further, a series of processes for implementing various functions are stored in a storage medium or the like in a form of a program as an example, the CPU loads such a program into the RAM or the like to perform modification or calculation processing on information, and thereby respective functions are implemented.

Note that, for a program, a form in which the program is installed in advance in the ROM or other storage media, a form in which the program is provided in a state of being stored in a computer readable storage medium, a form in which the program is delivered via a wired or wireless communication connection, or the like may be applied.

The computer readable storage medium may be a magnetic disc, an optical magnetic disc, a CD-ROM, a DVD-ROM, a semiconductor memory, or the like.

Figure 4:
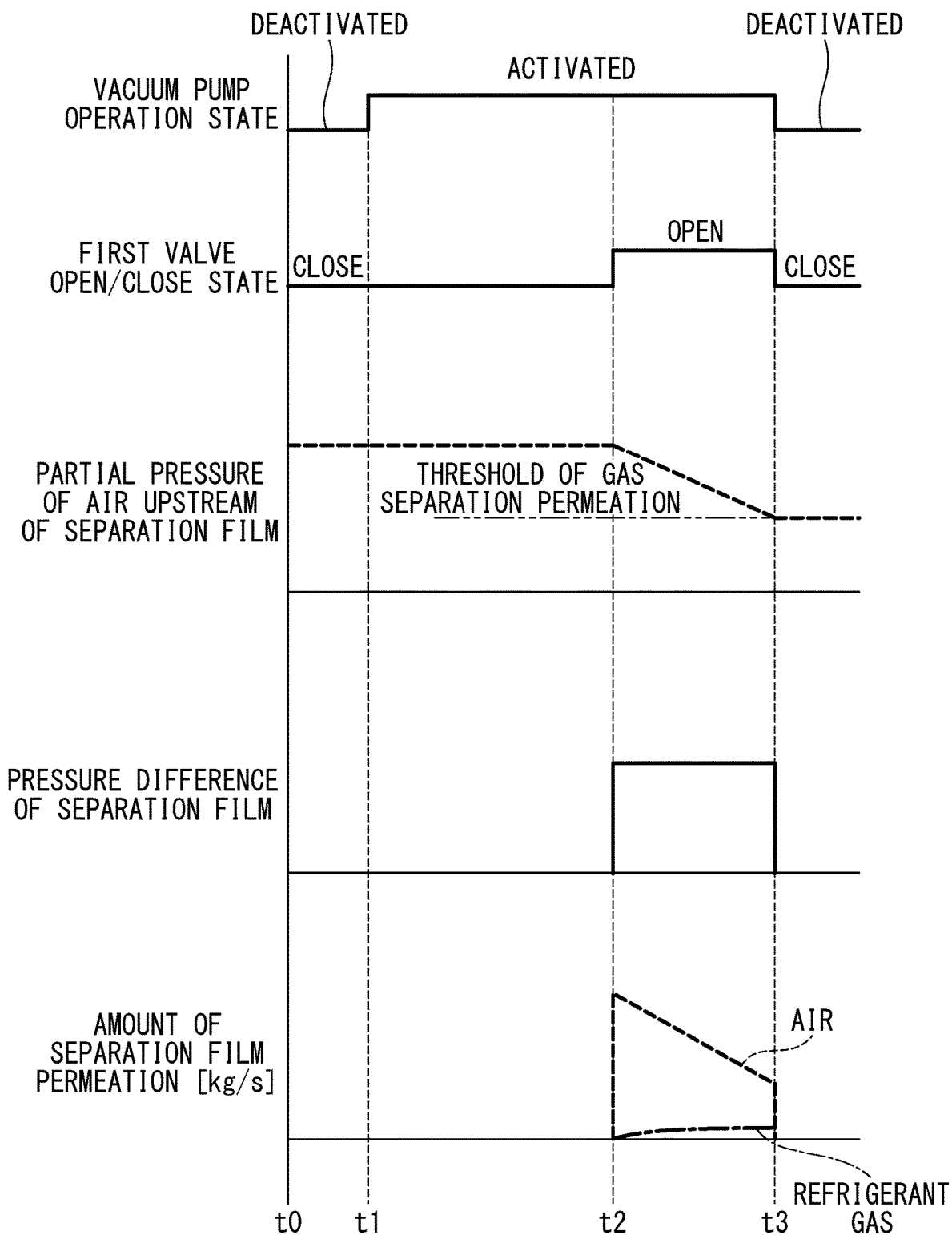
FIG. 4 is a diagram illustrating a change in the pressure or the amount of permeation due to operation of a vacuum pump and opening and closing of a first valve.

As illustrated in FIG. 4, a state where the vacuum pump 27 is deactivated and the first valve 24 is closed is the state before air is discharged (t0 to t1 in FIG. 4). At this time, the partial pressure of the air upstream of the separation films 23b is constant. Further, there is no pressure difference between the upstream and downstream sides of the separation films 23b, and no gas permeation occurs.

Next, the vacuum pump 27 is activated (t1 to t3 in FIG. 4). The third valve 26 is opened. At this time, the partial pressure of the air upstream of the separation films 23b is constant. Further, there is no pressure difference between the upstream and downstream sides of the separation films 23b, and no gas permeation occurs.

Note that the first valve 24 is not operated for a predetermined period after the activation of the vacuum pump 27 is started (t1 to t2 in FIG. 4). This is done for discharging all the gas present in the exhaust pipes 81, 82 downstream of the first valve 24.

Next, the first valve 24 is opened (t2 to t3 in FIG. 4). At this time, a pressure difference occurs between the upstream and downstream sides of the separation films 23b. Accordingly, permeation of air from the separation films 23b starts. As the air permeates the separation films 23b, the partial pressure of the air upstream of the separation films 23b decreases. Further, permeation of a small amount of the refrigerant gas starts as time elapses.

Note that, since the vacuum pump 27 is in operation, the pressure difference is constant. However, the same does not applies to a case where the amount of the gas permeating the separation films 23*b* is larger than the amount of the gas discharged by the vacuum pump 27.

The amount of permeation of air and the amount of permeation of a refrigerant gas change as follows as time elapses.

While the mixed gas present upstream of the separation films 23*b* contains the refrigerant gas and the air, the ratio of the air is much smaller than that of the refrigerant gas. Further, the air permeation rate is much higher than the refrigerant gas permeation rate. Thus, when a pressure difference occurs between the upstream and downstream sides of the separation films 23*b*, the amount of permeation of air sharply increases and then gradually decreases. In contrast, permeation of the refrigerant gas proceeds at a constant rate.

As set forth, the amount of permeation of air can be larger and the amount of permeation of the refrigerant gas can be smaller in an earlier stage where the permeation (separation) is started. That is, it is possible to allow more efficient permeation of air in an earlier stage where the permeation (separation) is started.

Next, the first valve 24 is closed into a state where no pressure difference is present between the upstream and downstream sides of the separation films 23*b* and eliminates permeation of gases caused by a pressure difference (from t3 in FIG. 4). At this time, the partial pressure of the air upstream of the separation films 23*b* becomes a lower pressure than that before the first valve 24 is opened (t0 to t2 in FIG. 4) because the air is removed by the separation films 23*b*.

Air that has entered the refrigerant system of the chiller 10 may be released to outside by repetition of the above batch process.

It is preferable that the timing to close the first valve 24 be in the early stage when the permeation (separation) is started as described above. In the present embodiment, the time of detection of a predetermined amount of air permeating the separation film is defined as the early stage where efficient air permeation can be achieved.

A method of determining that a predetermined amount of air has permeated the separation film will be described below.

[Method Based on Time Management of First Valve]

The amount of air permeating the separation films 23*b* when a predetermined pressure difference is given is found in advance via a test or the like. Then, based on the result thereof, the time to open the first valve 24 (the length from t2 to t3 in FIG. 4) is set. Accordingly, by managing the time to open the first valve 24, it is possible to determine that the predetermined amount of air has permeated the separation films 23*b*.

[Method Based on Partial Pressure of Air Upstream of Separation Film]

As illustrated in FIG. 4, when the partial pressure of the air present upstream of the separation films 23*b* becomes below a predetermined value, it is determined that the predetermined amount of air has permeated the separation films 23*b*. The relationship between the predetermined value of the partial pressure of air and the amount of air permeation is found in advance via a test or the like.

The partial pressure of air is calculated as follows.

First, the temperature Tb upstream of the separation films 23*b* is measured by the refrigerant temperature sensor 52. The saturated pressure of the refrigerant gas for the temperature Tb is then calculated based on the physical property of the refrigerant, and this saturated pressure is defined as the partial pressure of the refrigerant gas.

Further, the pressure Pb upstream of the separation films 23*b* is measured by the upstream pressure sensor 61. The value resulted from the pressure Pb (total pressure) minus the partial pressure of the refrigerant gas is then defined as the partial pressure of air.

[Method Based on Terminal Temperature Difference]

Figure 5:
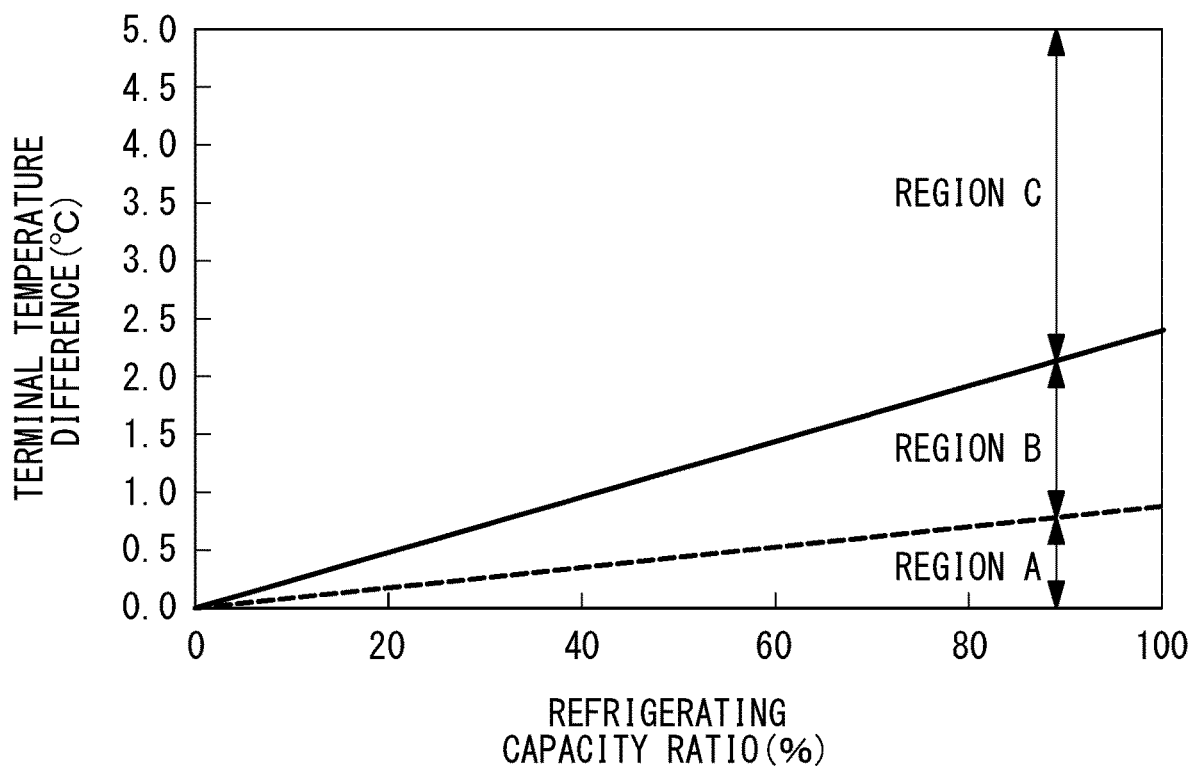
FIG. 5 is a diagram illustrating a change in a terminal temperature difference.

The terminal temperature difference is the difference between the saturated temperature of the condenser 12 and the outlet temperature of the cooling medium of the condenser 12. When air enters the condenser 12, the condensing heat transfer coefficient decreases, and the terminal temperature difference becomes relatively larger. That is, when this value is larger, this means that more air has entered the condenser 12. For example, as illustrated in FIG. 5, it can be determined that the amount of entering air is smaller in region A where the terminal temperature difference is small, and the amount of entering air becomes larger as the terminal temperature difference becomes larger through region B to region C.

The temperature Td of the condenser 12 (defined as the saturated temperature inside the condenser 12) is measured by a condenser temperature sensor 53. Further, the outlet temperature of the cooling medium of the condenser 12 (temperature Tc) is measured by a cooling medium temperature sensor 51.

As set forth, based on the amount of change in the terminal temperature difference (Td–Tc), it can be determined that a predetermined amount of air has permeated the separation films 23*b*.

When it is determined that a predetermined amount of air has permeated the separation films 23*b* in accordance with any of the methods as described above, the first valve 24 is closed by the control unit 50.

Note that, immediately after the first valve 24 is closed, the pressure of the space from the first valve 24 to the downstream side of the separation films 23*b* is lower than the pressure upstream of the separation films 23*b*. Thus, even if the first valve 24 is closed, the amount of gas permeation does not immediately become zero, and a small amount of gas would enter the space defined from the first valve 24 to the downstream side of the separation films 23*b* until the pressure difference is eliminated. Therefore, with the volume of the space from the first valve 24 to the downstream side of the separation films 23*b* being made as small as possible (ideally being zero), it is possible to reduce the amount of the gas that would permeate the separation films 23*b* after the first valve 24 is closed. This makes it possible to reduce the absolute amount of the refrigerant gas that would permeate the separation films 23*b* after the first valve 24 is closed.

As a method of obtaining a reduced volume of the space, for example, there is a method of forming the exhaust pipe 81 such that the length thereof upstream of the first valve 24 is shorter than the length thereof downstream of the first valve 24 or a method of designing the exhaust pipe 81 such that the channel volume thereof upstream of the first valve 24 is smaller than the channel volume thereof downstream of the first valve 24.

[Portion to Connect Air Purge Pipe]

Next, a predetermined portion to which the other end of the air purge pipe 72 (the end opposite to the end connected to the separation device 21) is connected will be described.

In the present embodiment, the other end of the air purge pipe 72 is connected to the refrigerant pipe 91 or the compressor 11. Specifically, the other end communicates with a section of a refrigerant channel having a static pressure lower than the static pressure inside the condenser 12. This provides a configuration in which a mixed gas flows from the condenser 12 toward the refrigerant pipe 91 or the compressor 11.

Figure 6:
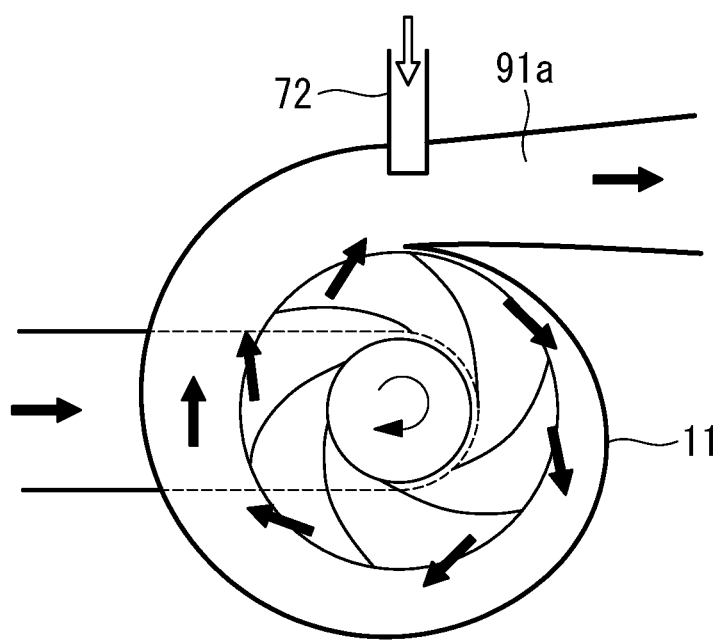
FIG. 6 is a diagram illustrating a diffuser part of a compressor.
Figure 7:
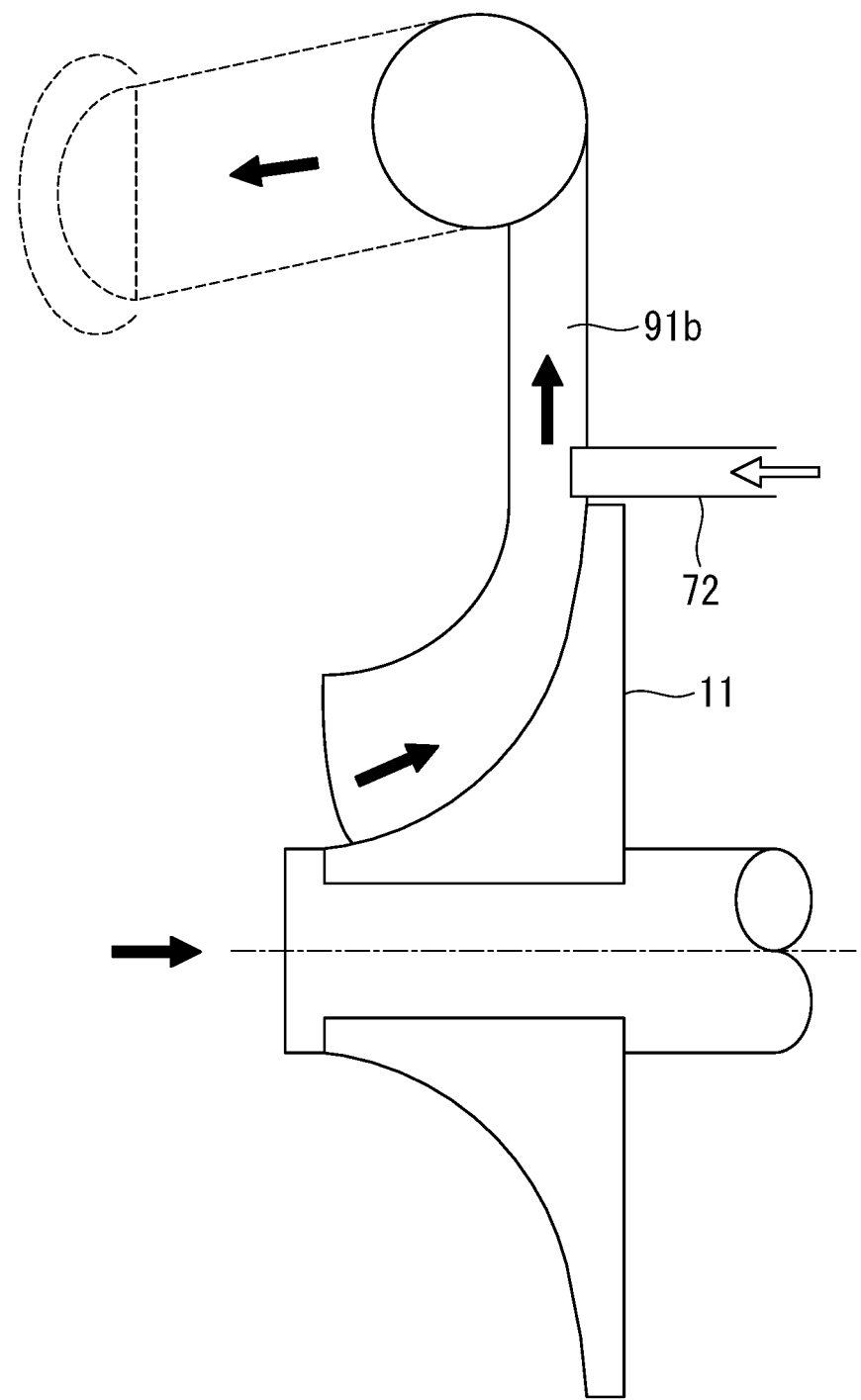
FIG. 7 is a diagram illustrating a diffuser part of the compressor.

The section of a refrigerant channel having a static pressure lower than the static pressure inside the condenser 12 may be, for example, channels upstream of diffuser parts 91*a*, 91*b* of the centrifugal type compressor 11, as illustrated in FIG. 6 and FIG. 7.

The dynamic pressure is predominant and the static pressure is lower on the upstream side of the diffuser parts 91*a*, 91*b*. Thus, the upstream side of the diffuser parts 91*a*, 91*b* has a lower static pressure than the static pressure inside the condenser 12.

Further, another example of the section of a refrigerant channel having a static pressure lower than the static pressure inside the condenser 12 is a section where the flow rate of the refrigerant gas is accelerated.

Figure 8:
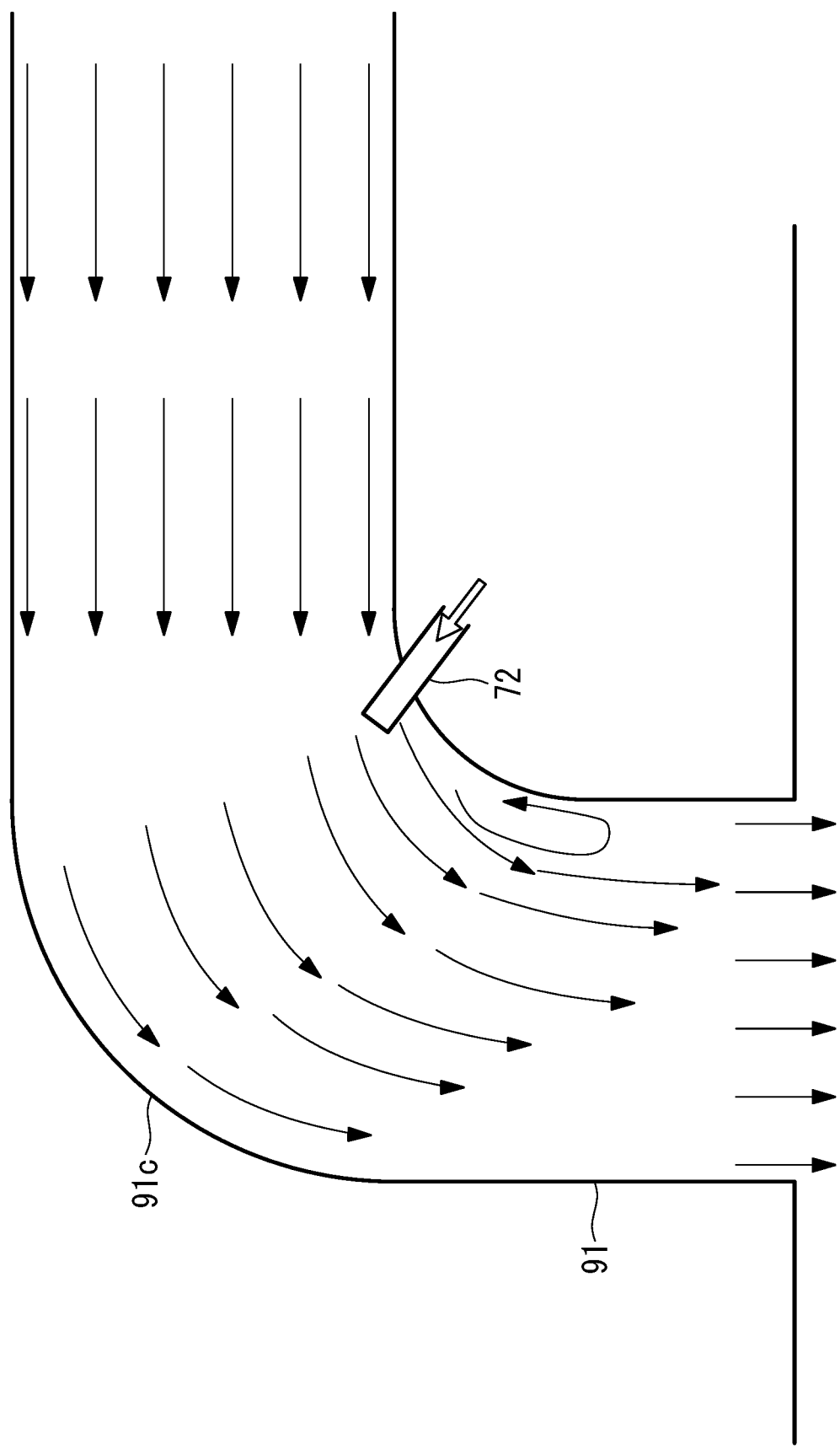
FIG. 8 is a diagram illustrating a bending part of a refrigerant pipe.

For example, as illustrated in FIG. 8, a section where the flow rate is accelerated is an inner side of the bending part 91*c* of the refrigerant pipe 91. Since the flow rate of the refrigerant gas is accelerated on the inner side of the bending part 91*c*, the static pressure becomes lower.

However, since the static pressure becomes higher at a portion where detachment occurs, it is required to avoid connection at the portion where detachment may occur.

Figure 9:
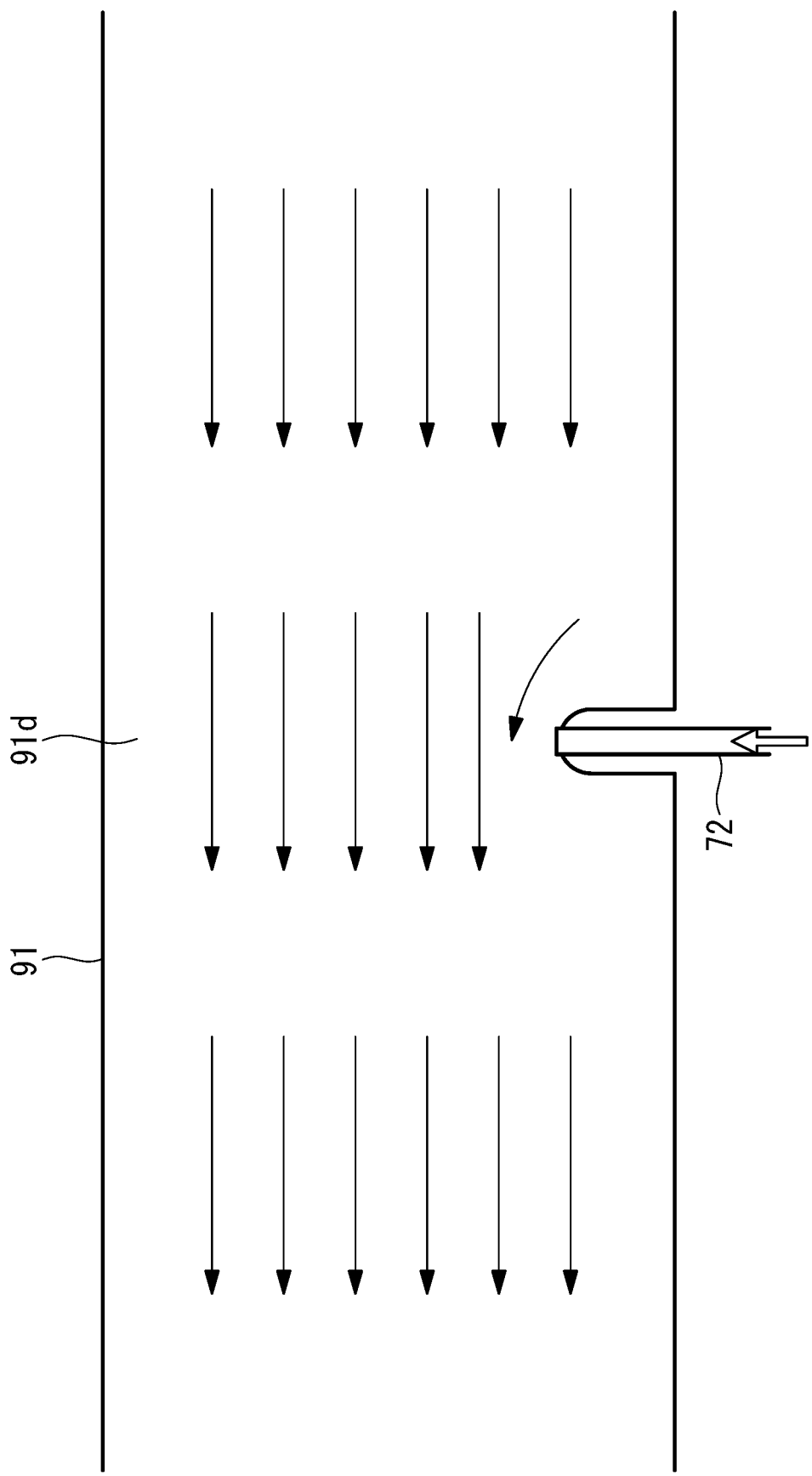
FIG. 9 is a diagram illustrating a constricted part of a refrigerant pipe.

Further, as illustrated in FIG. 9, the section where the flow rate is accelerated is a constricted part 91*d* of the refrigerant pipe 91. The constricted part 91*d* is a section where the pipe diameter is reduced. Since the flow rate of the refrigerant gas is accelerated in the constricted part 91*d*, the static pressure becomes lower.

In the present embodiment, the following advantageous effects are achieved.

Since the control unit 50 activates the vacuum pump 27 to open the first valve 24, it is possible to cause a pressure difference to occur across the separation films 23*b* by the vacuum pump 27 to extract air contained in a mixed gas.

Further, because the first valve 24 is closed to stop the permeation of air caused by a pressure difference at the time of detection of a predetermined amount of air permeating the separation films 23*b*, permeation of air is allowed only within the range that can allow efficient permeation of air (that is, the range where the amount of refrigerant gas permeation is small).

Further, since the control unit 50 determines that a predetermined amount of air has permeated the separation films 23*b* based on the duration of the first valve 24 being in an open state, it is possible to determine whether or not the predetermined amount of air has permeated the separation films 23*b* in accordance with the duration of the first valve 24 being in an open state.

Further, since the control unit 50 determines that a predetermined amount of air has permeated the separation films 23*b* based on a measurement value of the upstream pressure sensor 61 and the measurement value of the refrigerant temperature sensor 52, it is possible to make determination on the amount of air permeation based on the partial pressure of the air that is present upstream of the separation films 23*b*.

Further, since the control unit 50 determines that a predetermined amount of air has permeated the separation film based on the difference between the measurement value of the temperature sensor and the saturated temperature of the condenser, it is possible to make determination on the amount of air permeation based on a so-called terminal temperature difference of the condenser.

Further, because a mixed gas from which air has been separated (mainly, a refrigerant gas) is returned to the upstream side of the condenser 12, the extracted refrigerant gas can be caused to contribute to refrigeration.

Second Embodiment

Next, a air purge device according to the second embodiment of the present disclosure will be described with reference to the drawings.

Note that the air purge device of the present embodiment differs from the air purge device according to the first embodiment in the configuration of the air purge system and the air discharge method. Thus, the same configurations will be labeled with the same references, and the description thereof will be omitted.

[Configuration of Air Purge Device]

Figure 10:
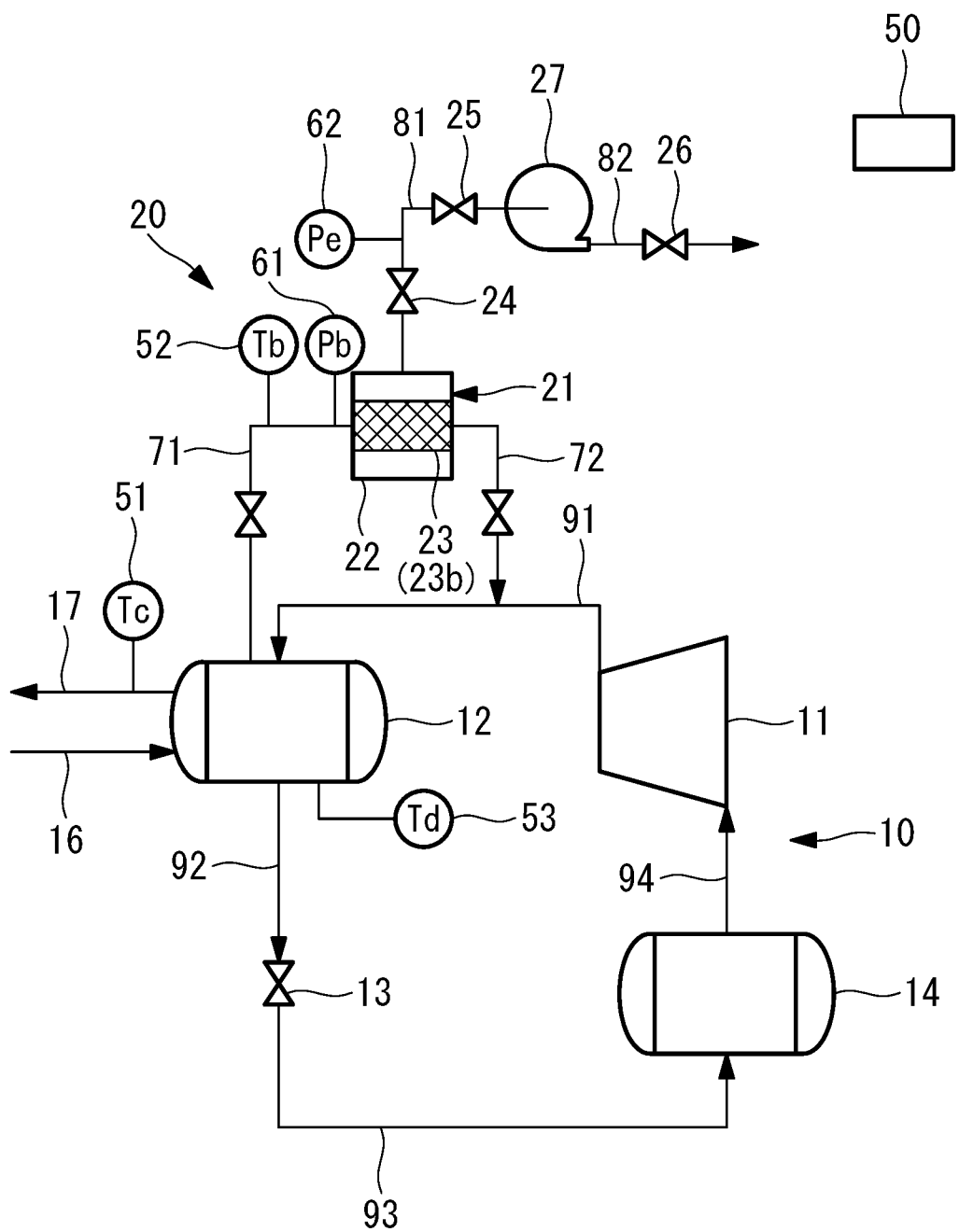
FIG. 10 is a configuration diagram of a air purge device according to a second embodiment of the present disclosure.

As illustrated in FIG. 10, the exhaust pipe 81 is provided with a second valve 25. The second valve 25 can block fluid communication of a gas flowing in the exhaust pipe 81.

The exhaust pipe 81 is provided with a downstream pressure sensor 62. The downstream pressure sensor 62 is provided between the first valve 24 and the second valve 25. The downstream pressure sensor 62 measures the pressure Pe (total pressure) downstream of the first valve 24.

[Air Discharge Method]

The air purge device 20 configured as described above is controlled as follows, for example, to externally release air that has entered the refrigerant system of the chiller 10.

Figure 11:
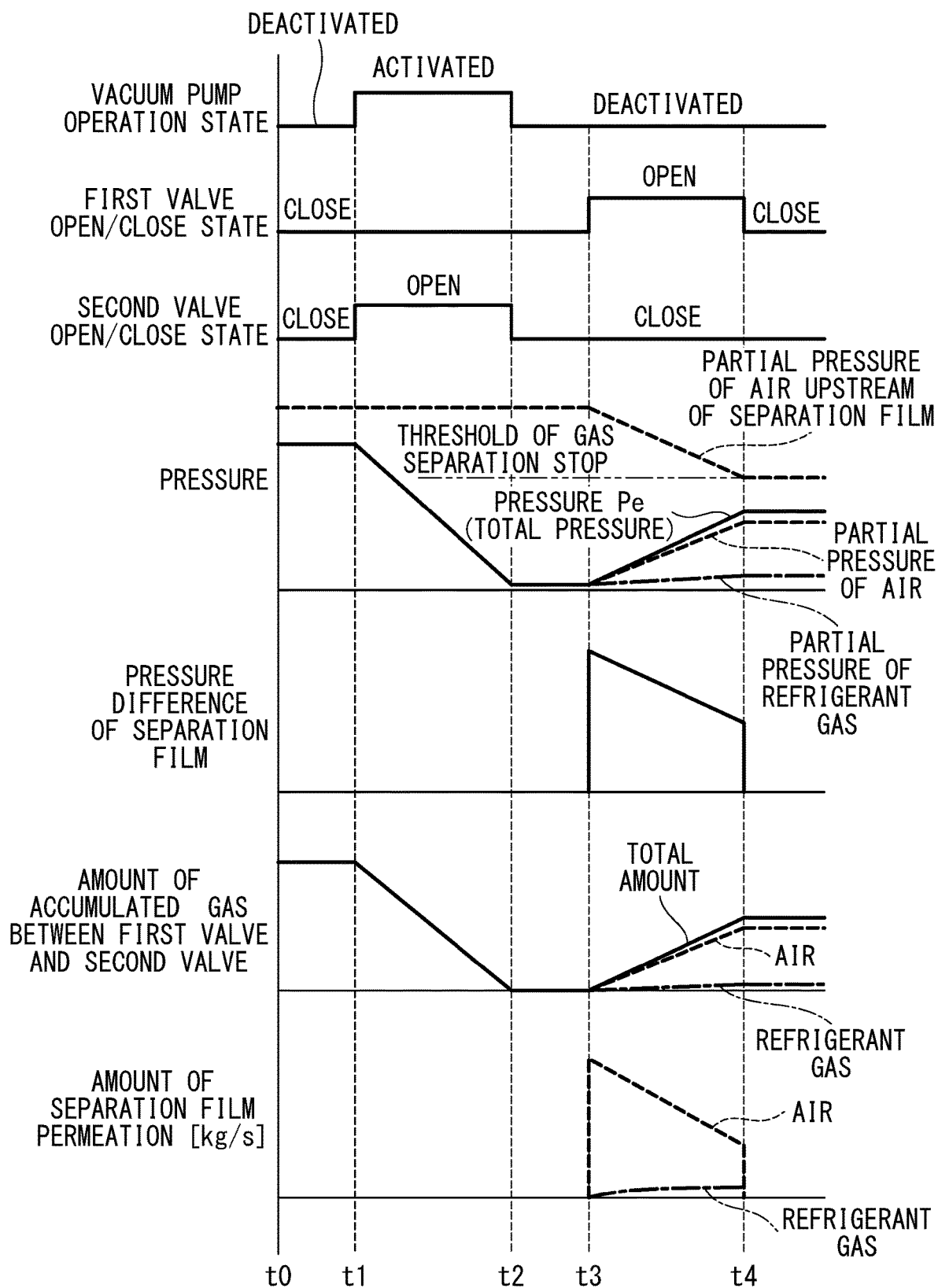
FIG. 11 is a diagram illustrating a change in the pressure or the amount of permeation due to operation of a vacuum pump, opening and closing of a first valve, and opening and closing a second valve.

As illustrated in FIG. 11, a state where the vacuum pump 27 is deactivated, the first valve 24 is closed, and the second valve 25 is closed is the state before air is discharged (t0 to t1 in FIG. 11). At this time, the partial pressure of the air upstream of the separation films 23*b* is constant. Further, the pressure Pe is constant. Further, there is no pressure difference between the upstream and downstream sides of the separation films 23*b*, and no gas permeation occurs. Further, the amount of the accumulated gas present in the space between the first valve 24 and the second valve 25 is constant.

Next, the second valve 25 is opened, and the vacuum pump 27 is activated (t1 to t2 in FIG. 11). Note that the third valve 26 is in an open state. At this time, the partial pressure of the air upstream of the separation films 23*b* is constant. Further, the pressure Pe gradually decreases. Further, there is no pressure difference between the upstream and downstream sides of the separation films 23*b*, and no gas permeation occurs. Further, the amount of the accumulated gas present in the space between the first valve 24 and the second valve 25 gradually decreases.

Next, after the pressure Pe has sufficiently decreased, the second valve 25 is closed, and the vacuum pump 27 is deactivated (t2 to t3 in FIG. 11). At this time, the partial pressure of the air upstream of the separation films 23*b* is constant. Further, the pressure Pe is constant at a lower pressure than that before the vacuum pump 27 is activated (t0 to t1 in FIG. 4). Further, there is no pressure difference between the upstream and downstream sides of the separation films 23*b*, and no gas permeation occurs. Further, the amount of the accumulated gas present in the space between the first valve 24 and the second valve 25 is constant at a smaller amount than that before the vacuum pump 27 is activated (t0 to t1 in FIG. 11).

Note that, when complete vacuuming is applied, the amount of the accumulated gas present in the space between the first valve 24 and the second valve 25 will be zero, and the pressure Pe will also be zero.

Next, the first valve 24 is opened (t3 to t4 in FIG. 11). At this time, a pressure difference occurs between the upstream and downstream sides of the separation films 23b. Accordingly, permeation of air from the separation films 23b starts. Further, permeation of a small amount of the refrigerant gas starts as time elapses. Further, since the gas that has permeated the separation films 23b is accumulated in the space between the downstream side of the separation films 23b and the second valve 25, the pressure Pe gradually increases, and the pressure difference gradually decreases.

Because the air permeates the separation films 23b, the partial pressure of the air upstream of the separation films 23b decreases. Herein, while the pressure Pe is the total pressure of the air and the refrigerant gas, the pressure Pe mostly corresponds to the partial pressure of the air, and the partial pressure of the refrigerant gas is much smaller than that of the air.

The amount of air permeation and the amount of refrigerant gas permeation change as follows as time elapses.

While the mixed gas that is present upstream of the separation films 23b contains the refrigerant gas and the air, the ratio of the air is much smaller than that of the refrigerant gas. Further, the air permeation rate is much higher than the refrigerant gas permeation rate. Thus, when a pressure difference occurs between the upstream and downstream sides of the separation films 23b, the amount of air permeation sharply increases and then gradually decreases. In contrast, permeation of the refrigerant gas proceeds at a constant rate. Note that, since the separation films 23b is originally less permeable to the refrigerant gas, the amount of the accumulated refrigerant gas is much smaller than the amount of accumulated air.

As set forth, the amount of air permeation can be larger and the amount of refrigerant gas permeation can be smaller in an earlier stage where the permeation (separation) is started. That is, it is possible to allow more efficient permeation of the air in an earlier stage where the permeation (separation) is started.

Next, the first valve 24 is closed into a state where no pressure difference is present between the upstream and downstream sides of the separation films 23b, and the permeation of gases caused by a pressure difference is eliminated (from t4 in FIG. 11). At this time, the partial pressure of the air upstream of the separation films 23b is constant at a lower pressure than that before the first valve 24 is opened, because the air has been removed by the separation films 23b (t0 to t3 in FIG. 11). Further, the pressure Pe is constant at a higher pressure than that after the vacuum pump 27 is deactivated and before the first valve 24 is opened (t2 to t3 in FIG. 11).

The timing to close the first valve 24 is the same as that in the first embodiment.

In this state, by opening the second valve 25 and the third valve 26 and activating the vacuum pump 27, it is possible to release the separated air to outside.

Air that has entered the refrigerant system of the chiller 10 may be released to outside by repetition of the above batch process.

In the present embodiment, the following advantageous effects are achieved.

The control unit 50 closes the first valve 24 and opens the second valve 25 before activating the vacuum pump 27, closes the second valve 25 after activating the vacuum pump 27 and before opening the first valve 24, and then deactivates the vacuum pump 27. Thus, the pressure difference between the pressure of the part between the first valve 24 and the second valve 25 reduced by the vacuum pump 27 and the pressure upstream of the separation films 23b can be used as driving force required to allow the air to permeate the separation films 23b.

Further, because the maximum amount of permeable air in a single time of process is limited to the channel volume of the exhaust pipe 81 between the separation films 23b and the second valve 25, the time required for the process is shortened. Thus, a single time of process can be completed in the early stage where permeation (separation) is started. This enables efficient permeation of air.

Third Embodiment

Next, a air purge device according to the third embodiment of the present disclosure will be described with reference to the drawings.

Note that the air purge device of the present embodiment differs from the air purge devices according to the first embodiment and the second embodiment in that a film heating unit that heats the separation film is provided. Thus, the same configurations will be labeled with the same references, and the description thereof will be omitted.

Figure 12:
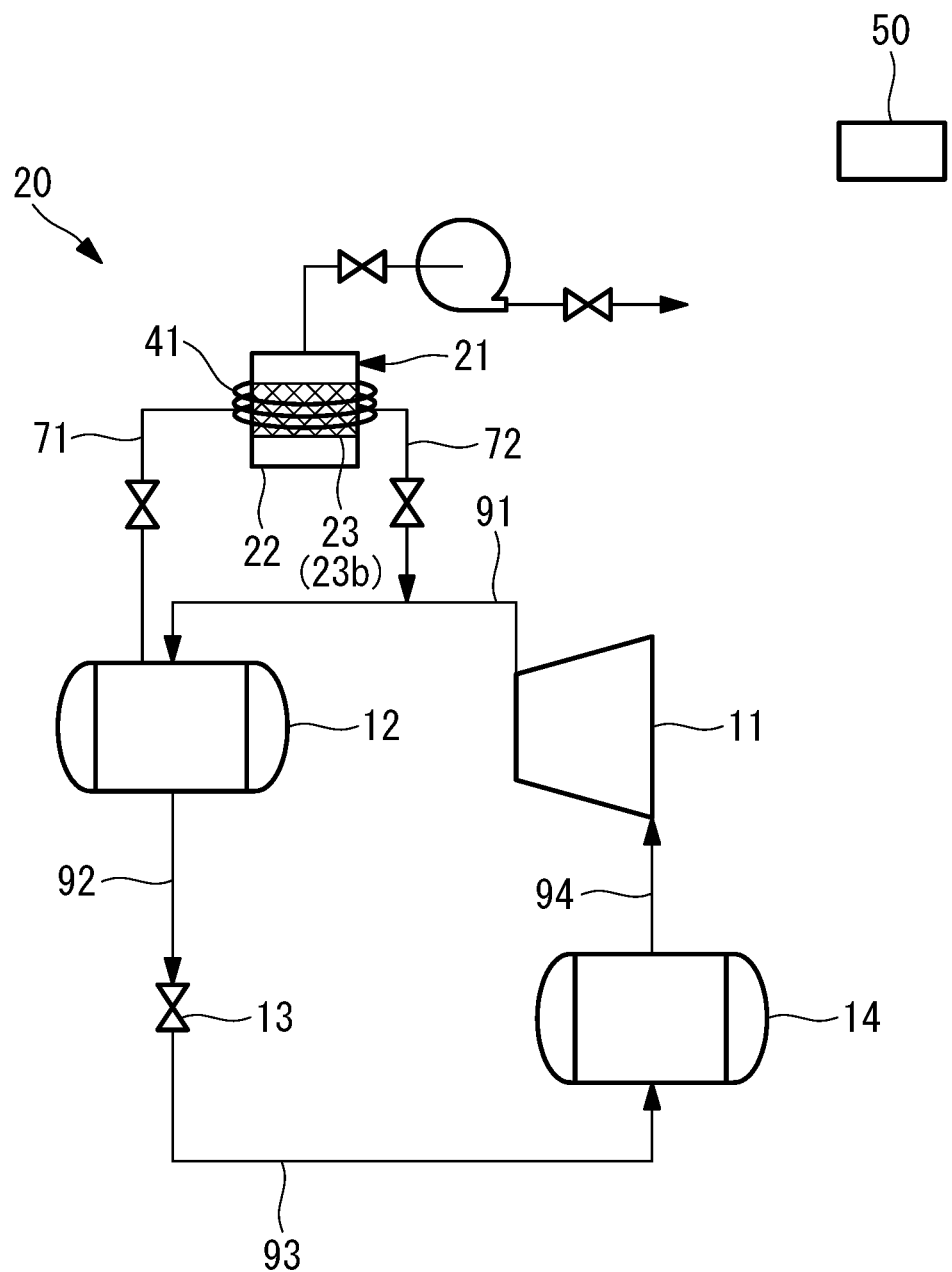
FIG. 12 is a diagram illustrating a film heating unit in a air purge device according to a third embodiment of the present disclosure.

As illustrated in FIG. 12, the air purge device 20 has a film heating unit 41. The film heating unit 41 is an apparatus that heats the separation films 23b from the outside of the container 22. By heating the separation films 23b by the film heating unit 41, it is possible to heat the mixed gas present inside the separation films 23b. For example, the film heating unit 41 electrically generates heat and is a band heater, a halogen lamp heater, or the like. The amount of heat generated by the film heating unit 41 is controlled by the control unit 50.

Figure 13:
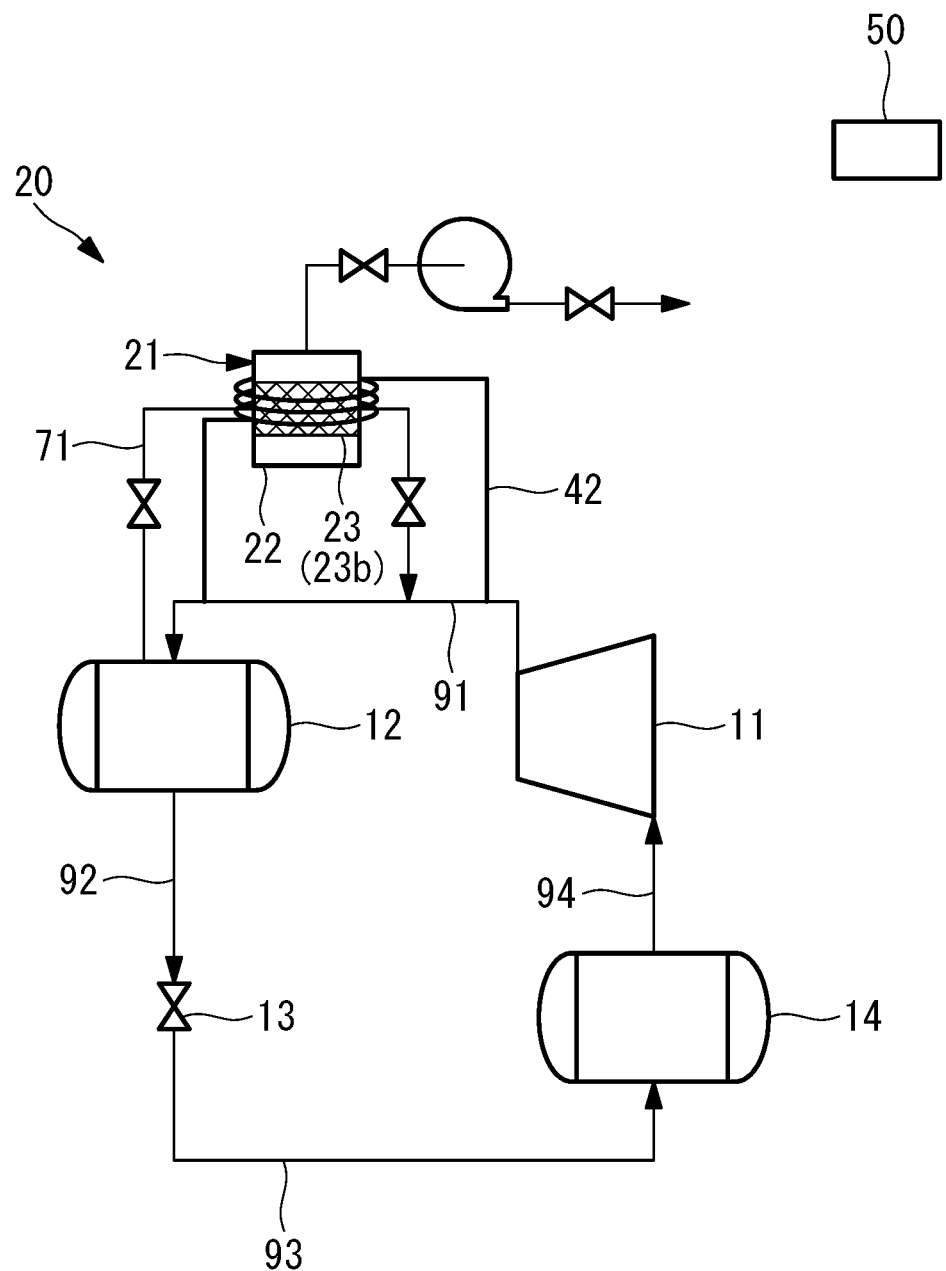
FIG. 13 is a diagram illustrating another form of a film heating unit in the air purge device according to the third embodiment of the present disclosure.

Further, as another example, the air purge device 20 has a film heating unit 42, as illustrated in FIG. 13. The film heating unit 42 is a tube through which a high-temperature, high-pressure refrigerant ejected from the compressor 11 flows. The tubular film heating unit 42 extends out of an ejection port of the compressor 11 (or the refrigerant pipe 91 close to the ejection port), winds around the container 22, and is then connected to the refrigerant pipe 91.

Note that, instead of the separation films 23b being heated, the air purge pipe 71 may be heated by the film heating unit 41. This can heat the mixed gas flowing inside the air purge pipe 71.

According to the present embodiment, the following advantageous effects are achieved.

Because the air purge device 20 has the film heating units 41, 42, the mixed gas present inside the cylindrical separation film 23b can be heated, and this causes more active molecular motion of air (the molecular diffusion speed increases) and allows the air to easily permeate the separation film 23b.

Modified Example 1

Figure 14:
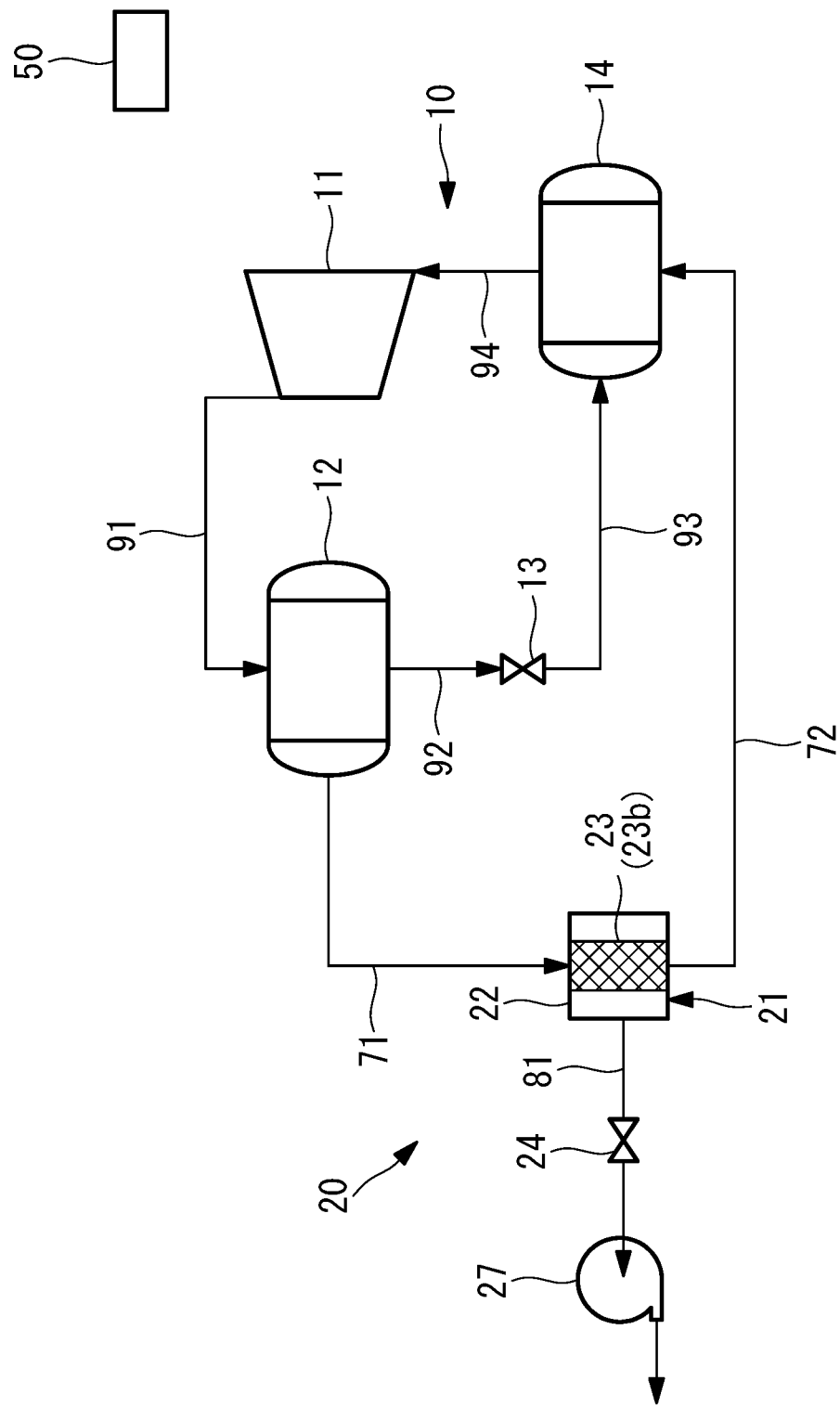
FIG. 14 is a configuration diagram of a air purge device according to Modified example 1 for the first embodiment to the third embodiment.

As illustrated in FIG. 14, the air purge pipe 72 may be connected to the evaporator 14 in the first embodiment to the third embodiment.

The configuration of the air purge device 20 according to the first embodiment to the third embodiment as described above is suitable in particular for a case where the separation films 23b are employed that have characteristics that allow slight permeation of a refrigerant gas along with air (specifically, as illustrated in FIG. 4 and FIG. 11, characteristics that, when a pressure difference occurs between the upstream and downstream sides of the separation films 23b, the amount of air permeation sharply increases and then gradually decreases, and the amount of refrigerant gas permeation slightly increases and then becomes substantially constant). However, it is not intended to exclude any combination with other separation films.

Fourth Embodiment

Next, a air purge device according to the fourth embodiment of the present disclosure will be described with reference to the drawings.

Note that the air purge device of the present embodiment differs from the air purge devices according to the first embodiment to the third embodiment in that a film heating unit that heats the separation film or a pipe heating unit that heats an air purge pipe is provided. Thus, the same configurations will be labeled with the same references, and the description thereof will be omitted.

[Configuration of Air Purge Device]

Figure 15:
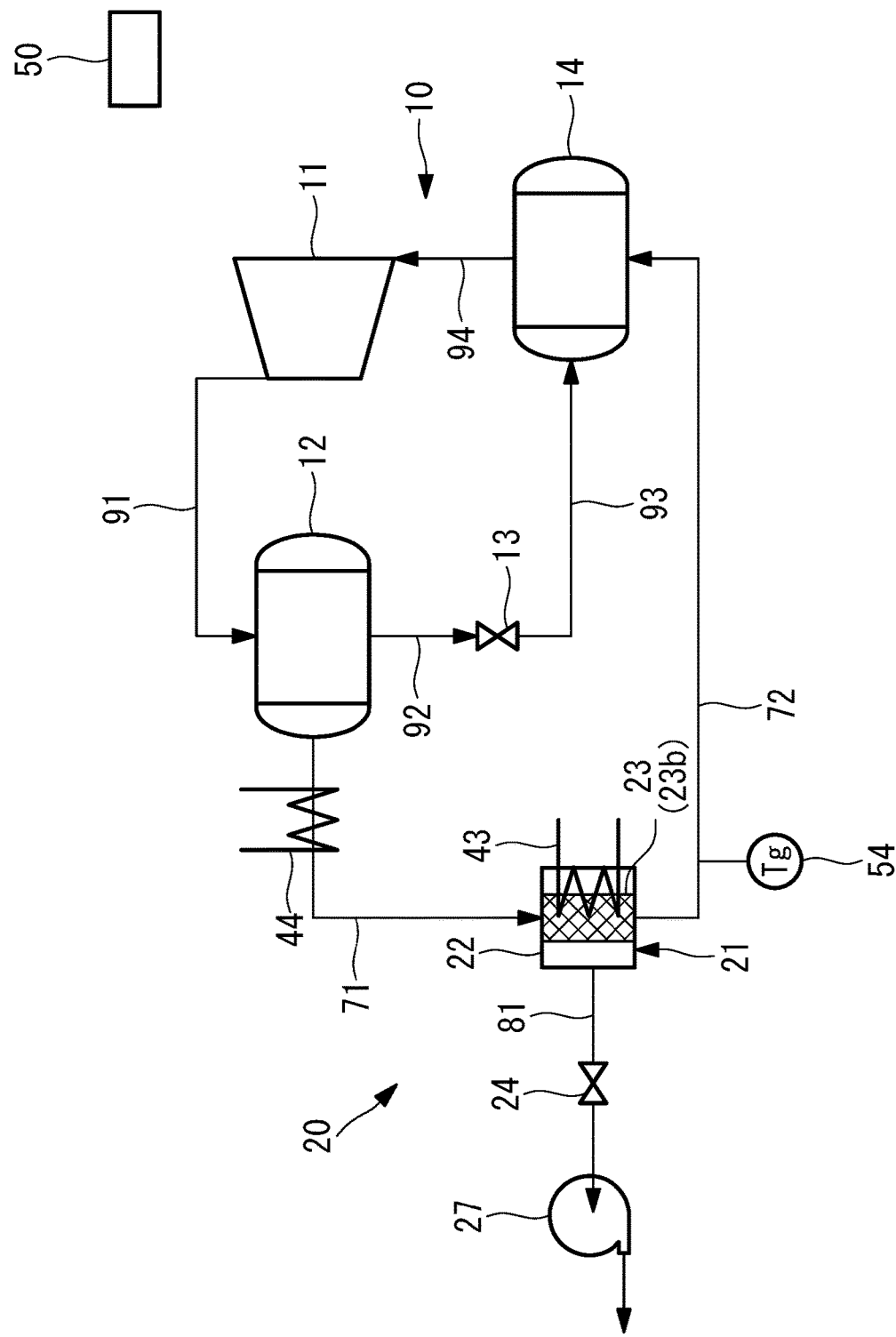
FIG. 15 is a configuration diagram of a air purge device according to a fourth embodiment of the present disclosure.

As illustrated in FIG. 15, the air purge pipe 72 has one end connected to the separation device 21 and the other end connected to the evaporator 14. Further, the air purge device 20 has a film heating unit 43 and/or a pipe heating unit 44.

Note that, in the present embodiment, the operation on the first valve 24 as described in the first embodiment to the third embodiment is not an essential configuration and may be omitted.

Further, an example of the material of the separation film 23b is polyimide. This material is characterized in being less permeable to a refrigerant gas and also less permeable to air than the separation film 23b of the air purge device 20 according to the first embodiment to the third embodiment.

The film heating unit 43 is an apparatus that heats the separation films 23b from the outside of the container 22. By heating the separation films 23b by the film heating unit 43, it is possible to heat a mixed gas present inside the separation films 23b. For example, the film heating unit 43 electrically generates heat and is a band heater, a halogen lamp heater, or the like. The amount of heat generated by the film heating unit 43 is controlled by the control unit 50.

The film heating unit 43 heats the mixed gas present inside the separation films 23b and thereby can increase the diffusion speed of the molecular motion of the mixed gas.

This can increase a rate that the air contained in the mixed gas permeates the separation films 23b (hereafter, simply referred to as "permeation rate") and can increase the amount of air permeation per unit time without an increase of the area of the separation films 23b compared to a case where the film heating unit 43 is not provided.

Figure 16:
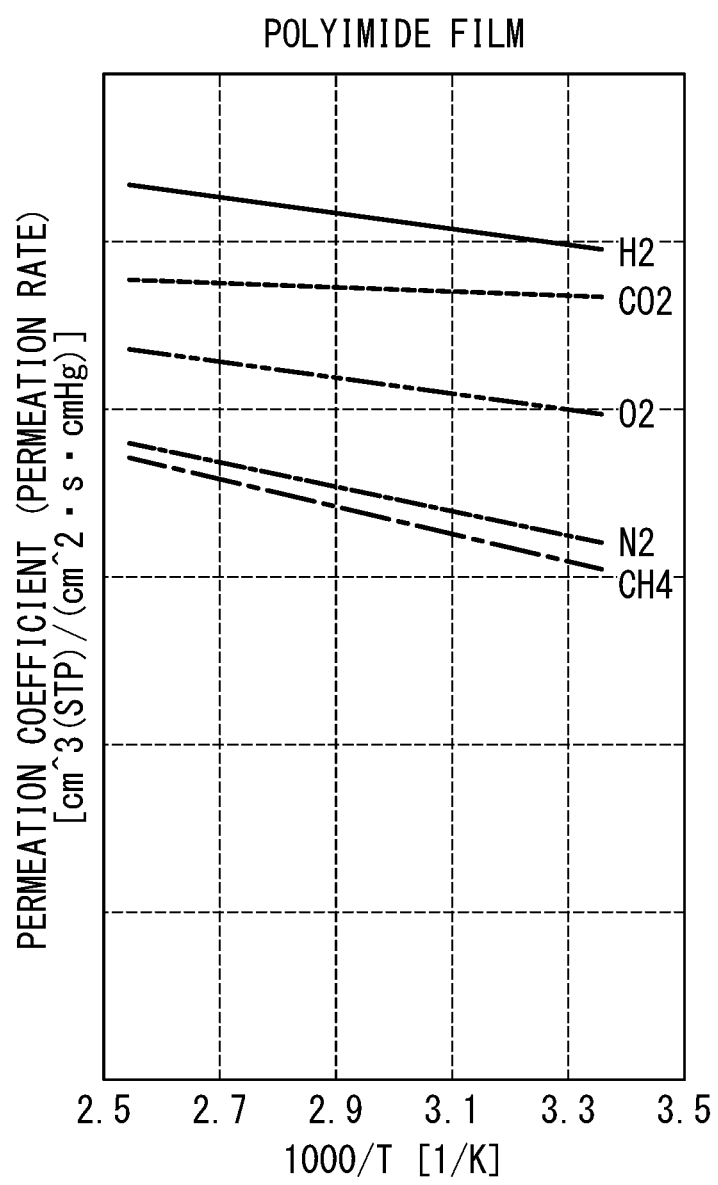
FIG. 16 is a graph representing relationships between the temperature (indicated by reciprocals) and the permeation rate on a gas type basis when a polyimide film is used as the separation films.

FIG. 16 (N. Tanihara, et. al., Journal of the Japan Petroleum Institute, 59(6), 276-282 (2016)) illustrates a graph representing relationships between the temperature (indicated by reciprocals) and the permeation rate on a gas type basis when a polyimide film is used as the separation films 23b. According to the graph of FIG. 16, it is found that, for the components of air (nitrogen (N2) and oxygen (O2)), the permeation rate increases as the temperature increases. This is because the diffusion speed of molecular motion increases due to a rise in temperature.

The pipe heating unit 44 is an apparatus that heats the mixed gas flowing inside the air purge pipe 71. For example, the pipe heating unit 44 electrically generates heat and is a band heater, a halogen lamp heater, or the like. The amount of heat generated by the pipe heating unit 44 is controlled by the control unit 50.

The pipe heating unit 44 may be those directly heating the inside of the air purge pipe 71 and may be those indirectly, externally heating the inside of the air purge pipe 71.

With the generated heat of the pipe heating unit 44, it is possible to suppress a phenomenon of condensation of the saturated refrigerant gas caused by external cooling of the air purge pipe 71 and thus avoid a phenomenon of blockage of the air purge pipe 71 caused by the condensed gas refrigerant.

Further, by heating the mixed gas, it is possible to increase the diffusion speed of the molecular motion of air contained in the mixed gas. The effect obtained thereby is the same as that obtained by the film heating unit 43.

In the air purge device 20 according to the present embodiment, it is not necessarily required to provide both the film heating unit 43 and the pipe heating unit 44, and it is only required to provide either one of the units.

However, the pipe heating unit 44 is preferably a requirement. This is because, with only the film heating unit 43, the air purge pipe 71 may be blocked by a condensed gas refrigerant.

Further, it is more preferable to provide both the film heating unit 43 and the pipe heating unit 44 and configure the same to heat the mixed gas by the pipe heating unit 44 arranged upstream in advance and compensate for heat dissipated before the mixed gas reaches the separation device 21 (the separation films 23b) with heat generated by the film heating unit 43.

[Control Method for Film Heating Unit and/or Pipe Heating Unit]

The air purge device 20 configured as described above activates the vacuum pump 27 to externally release the air that has entered the refrigerant system. At this time, the amount of heat generated by the film heating unit 43 and/or the pipe heating unit 44 is adjusted as follows.

That is, the amount of heat generated by the film heating unit 43 and/or the pipe heating unit 44 is adjusted based on the terminal temperature difference (Td−Tc).

Note that calculation of the terminal temperature difference and management of the amount of heat generation are performed by the control unit 50.

Figure 19:
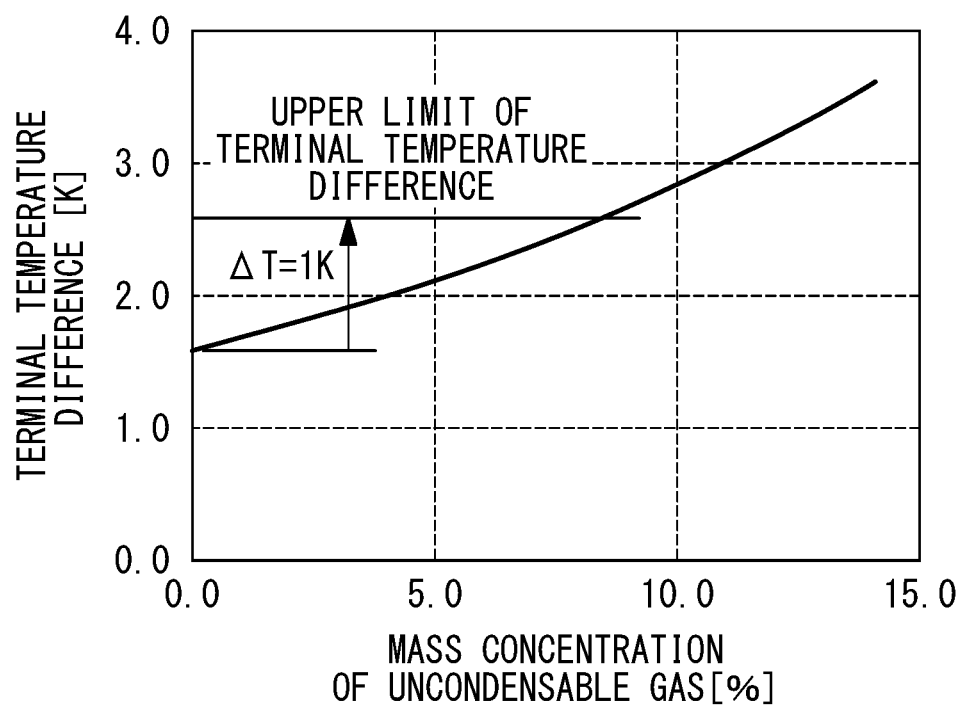
FIG. 19 is a graph illustrating a relationship between the mass concentration and the terminal temperature difference of air.

Specifically, provided that the increase degree $\Delta T$ is intended to be maintained at a predetermined temperature (for example, within 1 K), an environment in winter or the like in which the outside air temperature is low and the temperature of an extracted mixed gas is around 10° C. at the minimum is considered, for example. In such an environment, when the increase degree $\Delta T$ exceeds 1 K, the amount of heat generated by the film heating unit 43 and/or the pipe heating unit 44 is increased to increase the amount of air permeation, reduce the concentration of air contained in the mixed gas, and thereby cause the increase degree $\Delta T$ to fall within 1 K (see FIG. 19).

In such a way, by increasing the amount of heat generation within a range as required, it is possible to prevent an increase in the consumption energy or an increase in a load on the material forming the device.

Further, provided that the increase degree $\Delta T$ is intended to be maintained at a predetermined temperature (for example, within 1 K), an environment in summer or the like in which the outside air temperature is high and the temperature of an extracted mixed gas is around 40° C. at the maximum is considered, for example. In such an environment, when the increase degree $\Delta T$ is sufficiently small (for example, when it is within 0.5 K), the amount of heat generated by the film heating unit 43 and/or the pipe heating unit 44 may be reduced, or heat generation may be stopped.

Accordingly, it is possible to prevent an increase in the consumption energy or an increase in a load on the material forming the device.

Herein, to maintain the increase degree ΔT of the terminal temperature difference within 1 K, an outlet gas temperature sensor 54 may be installed to the air purge pipe 72, and the temperature Tg of the mixed gas in the outlet side of the separation films 23b may be measured to adjust the amount of heat generated by the film heating unit 43 and/or the pipe heating unit 44 so that the temperature Tg falls within a predetermined temperature range. The predetermined temperature range will be described later.

Accordingly, it is possible to maintain the increase degree ΔT within 1 K and maintain the amount of refrigerant gas permeation within a predetermined value.

The "amount of refrigerant gas permeation" refers to an amount of a refrigerant gas that inevitably permeates the separation films 23b and is forced to be discharged to outside of the system. When the amount of permeation is within a predetermined value (for example, within $7.85 \times 10^3$ [kg/day]), this is acceptable as the air purge device 20.

Note that it is desirable that the outlet gas temperature sensor 54 be installed to the air purge pipe 72 immediately downstream of the separation device 21. This is done for eliminating the influence of a temperature change due to heat dissipation in the air purge pipe 72 as much as possible.

Herein, the "predetermined temperature range" is, for example, from 10° C. to 100° C. This numerical value is found by experiments conducted by the inventors, and obviously, the range thereof can be changed as appropriate in accordance with the specification of the separation films 23b.

With respect to the predetermined temperature range, a higher temperature range is often used in winter than in summer, and this is because of the following reasons.

That is, in winter when the temperature of the extracted mixed gas is low due to the outside air temperature, the diffusion speed of molecules of air contained in the mixed gas is low, and the permeation rate in the separation films 23b is smaller than in summer. On the other hand, the amount of air entering the system is larger than in summer. Thus, the increase degree ΔT of the terminal temperature difference tends to be larger in winter than in summer. Therefore, in winter, the temperature range of the mixed gas is set higher than in summer to increase the diffusion speed of molecules of air.

Modified Example 2

Figure 17:
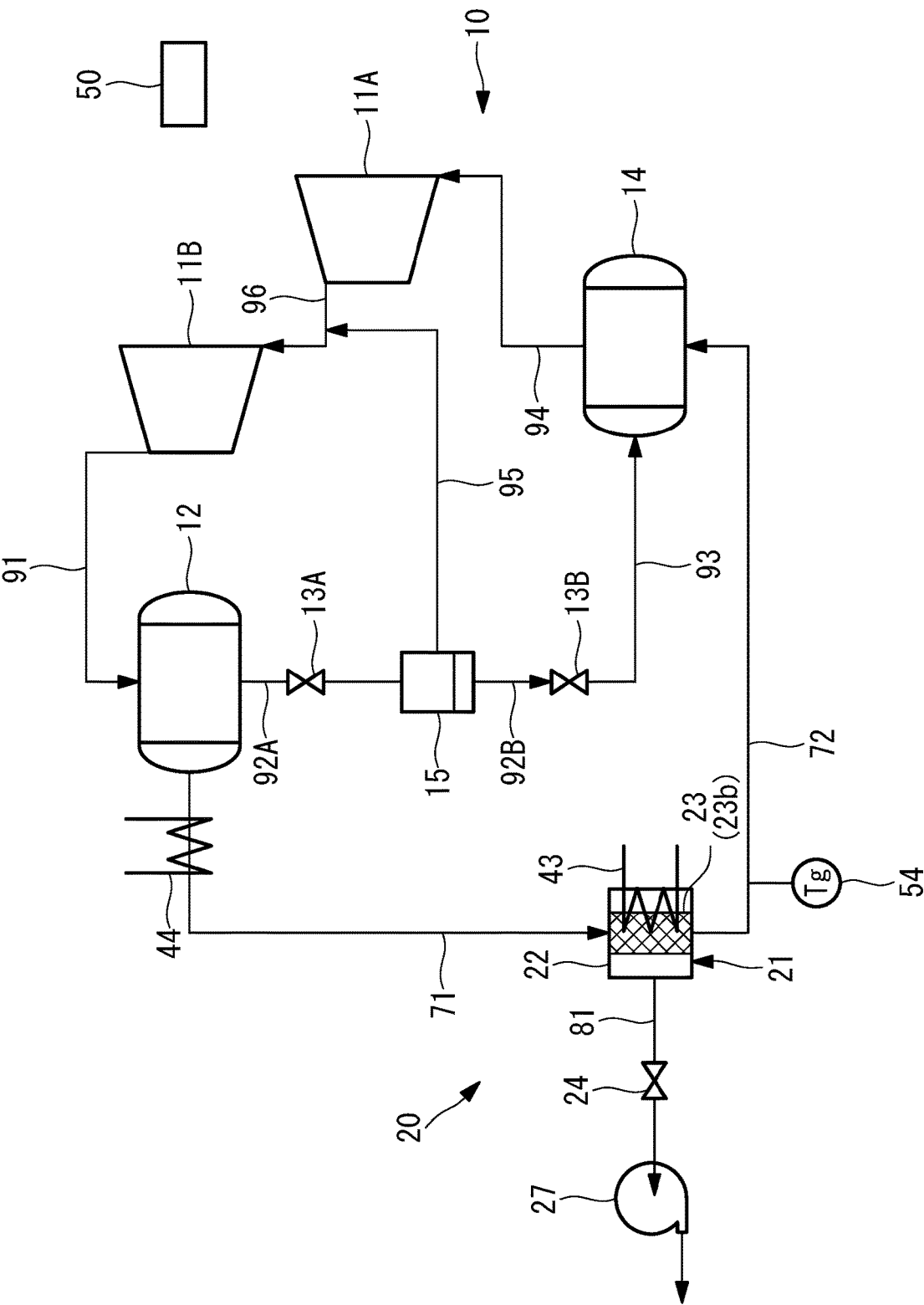
FIG. 17 is a configuration diagram of a air purge device according to Modified example 2 for the fourth embodiment of the present disclosure.

The air purge device 20 according to the present embodiment is also applicable to the chiller 10 as illustrated in FIG. 17.

In the chiller 10, refrigerant pipes 92A, 92B are provided instead of the refrigerant pipe 92, expansion valves 13A, 13B are provided instead of the expansion valve 13, and an intermediate cooler 15 is provided between the expansion valve 13A and the expansion valve 13B. Furthermore, the chiller 10 has a multi-stage compressor having a compressor 11A and a compressor 11B. Further, the chiller 10 is configured to return a gas refrigerant separated by the intermediate cooler 15 to a refrigerant pipe 96 between the compressor 11A and the compressor 11B via a refrigerant pipe 95.

Modified Example 3

Figure 18:
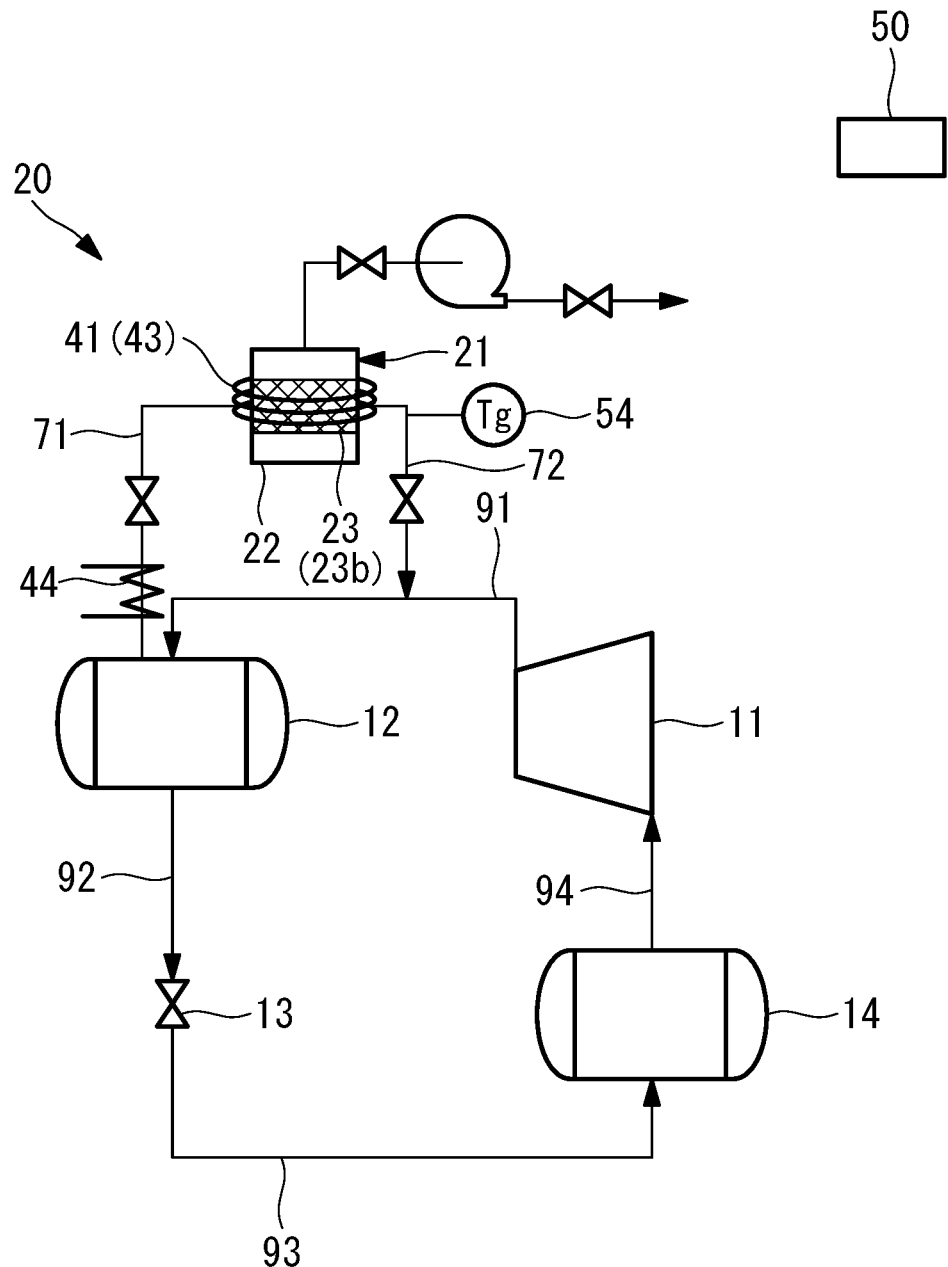
FIG. 18 is a configuration diagram of a air purge device according to Modified example 3 for the fourth embodiment of the present disclosure.

As illustrated in FIG. 18, with addition of the pipe heating unit 44 to the air purge pipe 71 of the air purge device 20 illustrated in FIG. 12, the air purge device 20 illustrated in FIG. 12 can be changed into the configuration of the air purge device 20 according to the present embodiment.

In the present embodiment, the following advantageous effects are achieved.

Because the air purge device 20 has the pipe heating unit 44, it is possible to suppress a phenomenon of condensation of a saturated refrigerant gas caused by external cooling of the air purge pipe 71 and thus avoid a phenomenon of blockage of the air purge pipe 71 caused by the condensed gas refrigerant.

Further, by heating the mixed gas, it is possible to increase the air permeation rate and increase the amount of air permeation per unit time without an increase of the area of the separation films 23b compared to a case where the pipe heating unit 44 is not provided.

Further, with the air purge device 20 further having the film heating unit 43, it is possible to compensate for heat dissipated before the mixed gas reaches the separation device 21 (the separation films 23b).

Further, the control unit 50 adjusts the amount of heat generated by the film heating unit 43 and/or the pipe heating unit 44 based on the terminal temperature difference.

Specifically, the control unit 50 increases the amount of heat generation when the increase degree ΔT exceeds 1 K. Accordingly, by increasing the amount of heat generation within a range as required, it is possible to prevent an increase in the consumption energy or an increase in a load on the material forming the device.

Further, the control unit 50 reduces the amount of heat generation or stops the heat generation when the increase degree ΔT is less than or equal to 0.5 K. Accordingly, it is possible to prevent an increase in the consumption energy or an increase in a load on the material forming the device.

Further, the control unit 50 may adjust the amount of heat generated by the film heating unit 43 and/or the pipe heating unit 44 so that the temperature Tg of the mixed gas at the outlet of the separation films 23b falls within a predetermined temperature range. Accordingly, it is possible to maintain the increase degree ΔT within 1 K and maintain the amount of refrigerant gas permeation within $7.85 \times 10^3$ [kg/day].

The configuration of the air purge device 20 according to the fourth embodiment as described above is suitable in particular when the separation films 23b characterized in being extremely impermeable to a refrigerant gas and also less permeable to air is employed. However, it is not intended to exclude any combination with other separation films.

Each embodiment as described above is understood as follows, for example.

That is, a air purge device (20) according to one aspect of the present disclosure includes: an air purge pipe (71, 72) connected to a condenser (12) and configured to extract a mixed gas containing a refrigerant gas and an uncondensable gas from the condenser; a separation film (23b) provided to the air purge pipe and configured to separate, by a pressure difference, an uncondensable gas from the mixed gas extracted by the air purge pipe; an exhaust pipe (81, 82) configured to externally guide a gas containing the uncondensable gas separated by the separation film; a first valve (24) provided to the exhaust pipe; a vacuum pump (27) provided downstream of the first valve in the exhaust pipe and configured to externally discharge a gas present inside the exhaust pipe; and a control unit (50), and the control unit activates the vacuum pump, opens the first valve, and then closes the first valve to stop permeation of an uncondensable gas caused by a pressure difference when detecting that a predetermined amount of an uncondensable gas permeates the separation film.

According to the air purge device of the present aspect, the air purge device includes: an air purge pipe connected to a condenser and configured to extract a mixed gas containing a refrigerant gas and an uncondensable gas from the condenser; a separation film provided to the air purge pipe and configured to separate, by a pressure difference, the uncondensable gas from the mixed gas extracted by the air purge pipe; an exhaust pipe configured to externally guide a gas containing the uncondensable gas separated by the separation film; a first valve provided to the exhaust pipe; a vacuum pump provided downstream of the first valve in the exhaust pipe and configured to externally discharge a gas present inside the exhaust pipe; and a control unit, and the control unit activates the vacuum pump to open the first valve. It is therefore possible to cause a pressure difference to occur across the separation film by using the vacuum pump and extract the uncondensable gas contained in the mixed gas.

The uncondensable gas is air, for example.

Further, the amount of permeation of the uncondensable gas that occupies a small ratio of the mixed gas decreases as time elapses after the valve is opened. On the other hand, the amount of permeation of the refrigerant gas that occupies a large ratio of the mixed gas and has an extremely low permeation rate compared to the uncondensable gas slightly increases as time elapses and then becomes substantially constant after the valve is opened. It is thus possible to allow more efficient permeation of the uncondensable gas in an earlier stage where the permeation (separation) is started. In the present aspect, the first valve is closed to stop the permeation of the uncondensable gas caused by a pressure difference at the time of detection of a predetermined amount of the uncondensable gas permeating the separation film, and thereby permeation of the uncondensable gas is allowed only within the range that allows efficient permeation of the uncondensable gas (that is, a range where the amount of refrigerant gas permeation is small). Further, by repeating this process as a batch process, it is thus possible to allow permeation of a sufficient amount of the uncondensable gas while suppressing the amount of leakage of the refrigerant to the outside air.

Note that the predetermined amount of the uncondensable gas (that is, the range that allows efficient permeation of the uncondensable gas) is determined in advance via a test or the like, for example.

Further, the air purge device according to one aspect of the present disclosure includes: a second valve (25) provided between the first valve and the vacuum pump in the exhaust pipe, and the control unit closes the first valve and opens the second valve before activating the vacuum pump, and then closes the second valve and deactivates the vacuum pump after activating the vacuum pump and before opening the first valve.

According to the air purge device of the present aspect, the air purge device includes: a second valve provided between the first valve and the vacuum pump in the exhaust pipe, and the control unit closes the first valve and opens the second valve before activating the vacuum pump, and then closes the second valve and deactivates the vacuum pump after activating the vacuum pump and before opening the first valve. Thus, the pressure between the first valve and the second valve reduced by the vacuum pump can be a pressure difference required for allowing the uncondensable gas to permeate the separation film.

Further, because the maximum amount of the permeable uncondensable gas in a single time of process is limited to the channel volume of the exhaust pipe between the separation film and the second valve, the time required for the process is shortened, and thus a single time of process can be completed in the early stage where permeation (separation) is started. This enables efficient permeation of the uncondensable gas. Further, by repeating this process as a batch process, it is thus possible to allow permeation of a sufficient amount of the uncondensable gas while suppressing the amount of leakage of the refrigerant to the outside air.

Further, in the air purge device according to one aspect of the present disclosure, the control unit determines that the predetermined amount of the uncondensable gas permeates the separation film based on a duration of the first valve being in an open state.

According to the air purge device of the present aspect, since the control unit determines that the predetermined amount of the uncondensable gas has permeated the separation film based on the duration of the first valve being in an open state, it is possible to determine whether or not the predetermined amount of the uncondensable gas has permeated the separation film in accordance with the duration of the first valve being in an open state. The relationship between the duration of the first valve being in an open state and the amount of the uncondensable gas permeation is determined in advance via a test or the like, for example.

Further, the air purge device according to one aspect of the present disclosure includes: a pressure sensor (61) provided to the air purge pipe upstream of the separation film; and a refrigerant temperature sensor (52) provided to the air purge pipe upstream of the separation film, and the control unit determines that the predetermined amount of the uncondensable gas permeates the separation film based on a measurement value of the pressure sensor and a measurement value of the refrigerant temperature sensor.

According to the air purge device of the present aspect, the air purge device includes: a pressure sensor provided to the air purge pipe upstream of the separation film; and a refrigerant temperature sensor provided to the air purge pipe upstream of the separation film, and the control unit determines that the predetermined amount of the uncondensable gas has permeated the separation film based on the measurement value of the pressure sensor and the measurement value of the refrigerant temperature sensor. It is therefore possible to make determination on the amount of the uncondensable gas permeation based on the partial pressure of the uncondensable gas that is present upstream of the separation film.

Further, the air purge device according to one aspect of the present disclosure includes a cooling medium temperature sensor (51) provided to a cooling medium outlet of the condenser, and the control unit determines that the predetermined amount of the uncondensable gas permeates the separation film based on a temperature difference between a measurement value of the cooling medium temperature sensor and a saturated temperature of the condenser.

According to the air purge device of the present aspect, the air purge device includes a temperature sensor provided to a cooling medium outlet of the condenser, and the control unit determines that the predetermined amount of the uncondensable gas has permeated the separation film based on a temperature difference between the measurement value of the temperature sensor and the saturated temperature of the condenser. It is therefore possible to make determination on the amount of the uncondensable gas permeation based on a so-called terminal temperature difference of the condenser.

Further, in the air purge device according to one aspect of the present disclosure, a length of the exhaust pipe upstream of the first valve is shorter than a length of the exhaust pipe downstream of the first valve.

According to the air purge device of the present aspect, since the length of the exhaust pipe upstream of the first valve is shorter than the length of the exhaust pipe downstream of the first valve, it is possible to reduce the channel volume of the exhaust pipe upstream of the first valve. This can reduce the absolute amount of the refrigerant gas that enters the exhaust pipe upstream of the first valve (the refrigerant gas permeating the separation film) after the first valve is closed.

Further, in the air purge device according to one aspect of the present disclosure, a channel volume of the exhaust pipe upstream of the first valve is smaller than a channel volume of the exhaust pipe downstream of the first valve.

According to the air purge device of the present aspect, since the channel volume of the exhaust pipe upstream of the first valve is smaller than the channel volume of the exhaust pipe downstream of the first valve, it is possible to reduce the channel volume of the exhaust pipe upstream of the first valve. This can reduce the absolute amount of the refrigerant that enters the exhaust pipe upstream of the first valve (the refrigerant permeating the separation film) after the first valve is closed.

Further, in the air purge device according to one aspect of the present disclosure, the air purge pipe communicates with a low-pressure section of a refrigerant channel guided to the condenser, and the low-pressure section is a section having a static pressure lower than a static pressure in the condenser.

According to the air purge device of the present aspect, the air purge pipe communicates with a low-pressure section of a refrigerant channel guided to the condenser, and the low-pressure section is a section having a static pressure lower than the static pressure in the condenser, and this causes a pressure difference to occur between the low-pressure section and a condenser. Accordingly, the mixed gas (mainly a refrigerant gas) from which the uncondensable gas has been separated can be returned to the upstream side of the condenser. Since the returned refrigerant gas is guided again to the condenser, the extracted refrigerant gas can be caused to contribute to refrigeration.

Further, in the air purge device according to one aspect of the present disclosure, the low-pressure section is located upstream of a diffuser part (91a, 91b) of a compressor (11).

According to the air purge device of the present aspect, the low-pressure section is located upstream of a diffuser part of a compressor. The upstream side of the diffuser part of the compressor is in a stage before the dynamic pressure is converted into the static pressure, thus has a predominant dynamic pressure and a low static pressure, and therefore can be a section having a static pressure lower than the static pressure inside the evaporator.

Further, in the air purge device according to one aspect of the present disclosure, the low-pressure section is a section (91c, 91d) in which a flow rate of a refrigerant gas is accelerated in the refrigerant channel.

According to the air purge device of the present aspect, the low-pressure section is a section in which the flow rate of the refrigerant gas is accelerated in the refrigerant channel. Since the dynamic pressure is larger and the static pressure is smaller in the section in which the flow rate of the refrigerant gas is accelerated, the section can be a section having a static pressure lower than the static pressure inside the evaporator.

Further, in the air purge device according to one aspect of the present disclosure, the air purge pipe is connected to an evaporator (14).

According to the air purge device of the present aspect, since the other end of the air purge pipe is connected to the evaporator, the mixed gas from which the uncondensable gas has been separated (mainly the refrigerant gas) can be returned to the evaporator.

Further, in the air purge device according to one aspect of the present disclosure, the separation film is shaped in a cylinder, and the air purge device includes a film heating unit (41, 42) configured to heat a mixed gas present inside the cylinder.

According to the air purge device of the present aspect, the separation film is shaped in a cylinder, and the air purge device includes a film heating unit configured to heat the mixed gas present inside the cylinder. Therefore, the molecular motion of the uncondensable gas is made active by heating, which allows easier permeation through the separation film.

Further, in the air purge device according to one aspect of the present disclosure, the film heating unit (41) is a heater configured to electrically generate heat.

According to the air purge device of the present aspect, since the film heating unit is a heater configured to electrically generate heat, the film heating unit can be installed using a simple configuration.

For example, the film heating unit is a band heater, a halogen lamp heater, or the like.

Further, in the air purge device according to one aspect of the present disclosure, the film heating unit (42) is a tube through which a high-temperature refrigerant ejected from a compressor flows.

According to the air purge device of the present aspect, since the film heating unit is a tube through which a high-temperature, high-pressure refrigerant ejected from a compressor flows, the film heating unit can be installed without a dedicated power supply or the like being provided.

Further, the air purge device according to one aspect of the present disclosure includes: an air purge pipe connected to a condenser and configured to extract a mixed gas containing a refrigerant gas and an uncondensable gas from the condenser; a separation film provided to the air purge pipe and configured to separate, by a pressure difference, an uncondensable gas from the mixed gas extracted by the air purge pipe; an exhaust pipe configured to externally guide a gas containing the uncondensable gas separated by the separation film; a vacuum pump provided to the exhaust pipe and configured to externally discharge a gas present inside the exhaust pipe; and a pipe heating unit (44) configured to heat a mixed gas present inside the air purge pipe upstream of the separation film.

According to the air purge device of the present aspect, since the air purge device includes the pipe heating unit, it is possible to suppress a phenomenon of condensation of a saturated refrigerant gas caused by external cooling of the air purge pipe and thus avoid a phenomenon of blockage of the air purge pipe caused by the condensed gas refrigerant.

Further, by heating the mixed gas, it is possible to increase the air permeation rate and increase the amount of air permeation per unit time without an increase of the area of the separation films compared to a case where the pipe heating unit is not provided.

For example, the pipe heating unit is a band heater, a halogen lamp heater, or the like.

Further, in the air purge device according to one aspect of the present disclosure, the separation film is shaped in a cylinder, and the air purge device includes a film heating unit (43) configured to heat a mixed gas present inside the cylinder.

According to the air purge device of the present aspect, since the separation film is shaped in a cylinder, the air purge device includes a film heating unit configured to heat the mixed gas present inside the cylinder, it is possible to compensate for heat dissipated before the mixed gas reaches the separation device (the separation film).

For example, the film heating unit is a band heater, a halogen lamp heater, or the like.

Further, the air purge device according to one aspect of the present disclosure includes: an air purge pipe connected to a condenser and configured to extract a mixed gas containing a refrigerant gas and an uncondensable gas from the condenser; a separation film provided to the air purge pipe and configured to separate, by a pressure difference, an uncondensable gas from the mixed gas extracted by the air purge pipe; an exhaust pipe configured to externally guide a gas containing the uncondensable gas separated by the separation film; and a vacuum pump provided to the exhaust pipe and configured to externally discharge a gas present inside the exhaust pipe, the separation film is shaped in a cylinder, and the air purge device includes a film heating unit configured to heat a mixed gas present inside the cylinder.

According to the air purge device of the present aspect, since the separation film is shaped in a cylinder, and the air purge device includes a film heating unit configured to heat the mixed gas present inside the cylinder, it is possible to increase the air permeation rate and increase the amount of air permeation per unit time without an increase of the area of the separation films compared to a case where the pipe heating unit is not provided.

Further, the air purge device according to one aspect of the present disclosure includes: a cooling medium temperature sensor provided to a cooling medium outlet of the condenser; and a control unit, and the control unit adjusts an amount of heat generation of the pipe heating unit and/or the film heating unit based on a temperature difference between a measurement value of the cooling medium temperature sensor and a saturated temperature of the condenser.

According to the air purge device of the present aspect, the air purge device includes a cooling medium temperature sensor provided to a cooling medium outlet of the condenser; and a control unit, and the control unit adjusts the amount of heat generation of the pipe heating unit and/or the film heating unit based on a temperature difference (terminal temperature difference) between the measurement value of the cooling medium temperature sensor and the saturated temperature of the condenser. It is therefore possible to prevent an increase in the consumption energy or an increase in a load on the material forming the device.

Further, in the air purge device according to one aspect of the present disclosure, the control unit increases the amount of heat generation of the pipe heating unit and/or the film heating unit when an increase degree of a temperature difference defined by the saturated temperature of the condenser minus the measurement value of the cooling medium temperature sensor exceeds 1 K.

According to the air purge device of the present aspect, since the control unit increases the amount of heat generation of the pipe heating unit and/or the film heating unit when the increase degree of a temperature difference defined by the saturated temperature of the condenser minus the measurement value of the cooling medium temperature sensor exceeds 1 K, it is possible to increase the amount of heat generation within a range as required, and it is thus possible to prevent an increase in the consumption energy or an increase in a load on the material forming the device.

Further, in the air purge device according to one aspect of the present disclosure, the control unit reduces the amount of heat generation of the pipe heating unit and/or the film heating unit or does not cause the pipe heating unit and/or the film heating unit to generate heat when an increase degree of a temperature difference defined by the saturated temperature of the condenser minus the measurement value of the cooling medium temperature sensor is less than or equal to 0.5 K.

According to the air purge device of the present aspect, the control unit reduces the amount of heat generation of the pipe heating unit and/or the film heating unit or does not cause the pipe heating unit and/or the film heating unit to generate heat when the increase degree of a temperature difference defined by the saturated temperature of the condenser minus the measurement value of the cooling medium temperature sensor is less than or equal to 0.5 K. It is therefore possible to prevent an increase in the consumption energy or an increase in a load on the material forming the device.

Further, the air purge device according to one aspect of the present disclosure includes an outlet gas temperature sensor provided to the air purge pipe downstream of the separation film, and the control unit adjusts the amount of heat generation of the pipe heating unit and/or the film heating unit so that the measurement value of the outlet gas temperature sensor falls within a predetermined temperature range.

According to the air purge device of the present aspect, the air purge device includes an outlet gas temperature sensor, and the control unit adjusts the amount of heat generation of the pipe heating unit and/or the film heating unit so that the measurement value of the outlet gas temperature sensor falls within a predetermined temperature range. It is therefore possible to maintain the increase degree $\Delta T$ within 1 K and maintain the amount of refrigerant gas permeation within $7.85 \times 10^3$ [kg/day].

The "predetermined temperature range" is, for example, from 10° C. to 100° C.

REFERENCE SIGNS LIST

10 chiller
11, 11A, 11B compressor
12 condenser
13, 13A, 13B expansion valve
14 evaporator
15 intermediate cooler
16 cooling water forward pipe
17 cooling water return pipe
20 air purge device
21 separation device
22 container
23 separation module
23a housing
23b separation film
23c air purge inlet
23d air purge outlet
23e air outlet
24 first valve
25 second valve
26 third valve
27 vacuum pump
41, 42, 43 film heating unit
44 pipe heating unit 50 control unit
51 cooling medium temperature sensor
52 refrigerant temperature sensor
53 condenser temperature sensor
54 outlet gas temperature sensor
61 upstream pressure sensor
62 downstream pressure sensor
71, 72 air purge pipe
81, 82 exhaust pipe
91, 92, 92A, 92B, 93, 94, 95, 96 refrigerant pipe
91a diffuser part
91b diffuser part
91c bending part
91d constricted part

The invention claimed is:

1. A method of operating an air purge device, wherein the air purge device includes:
an air purge pipe connected to a condenser and configured to extract a mixed gas containing a refrigerant gas and an uncondensable gas from the condenser;
a separation film provided to the air purge pipe and configured to separate, by a pressure difference, an uncondensable gas from the mixed gas extracted by the air purge pipe;
an exhaust pipe configured to externally guide a gas containing the uncondensable gas separated by the separation film;
a first valve provided to the exhaust pipe;
a vacuum pump provided downstream of the first valve in the exhaust pipe and configured to externally discharge a gas present inside the exhaust pipe; and
a control unit,
the method comprising:
activating the vacuum pump,
opening the first valve, and
then closing the first valve to stop permeation of an uncondensable gas caused by a pressure difference when detecting that a predetermined amount of an uncondensable gas permeates the separation film.

2. The method of operating the air purge device according to claim 1, wherein the air purge device further includes a second valve provided between the first valve and the vacuum pump in the exhaust pipe,
the method further comprising:
closing the first valve and opening the second valve before activating the vacuum pump, and
then closing the second valve and deactivating the vacuum pump after activating the vacuum pump and before opening the first valve.

3. The method of operating the air purge device according to claim 1, the method further comprising:
determining that the predetermined amount of the uncondensable gas permeates the separation film based on a duration of the first valve being in an open state.

4. The method of operating the air purge device according to claim 1, the method further comprising:
determining that the predetermined amount of the uncondensable gas permeates the separation film based on a pressure in the air purge pipe upstream of the separation film and a refrigerant temperature in the air purge pipe upstream of the separation film.

5. The method of operating the air purge device according to claim 1, the method further comprising: determining that the predetermined amount of the uncondensable gas permeates the separation film based on a temperature difference between a cooling medium temperature at a cooling medium outlet of the condenser and a saturated temperature of the condenser.

6. The method of operating the air purge device according to claim 1, wherein a length of the exhaust pipe upstream of the first valve is shorter than a length of the exhaust pipe downstream of the first valve.

7. The method of operating the air purge device according to claim 1, wherein a channel volume of the exhaust pipe upstream of the first valve is smaller than a channel volume of the exhaust pipe downstream of the first valve.

8. The method of operating the air purge device according to claim 1,
wherein the air purge pipe communicates with a low-pressure section of a refrigerant channel guided to the condenser, and
wherein the low-pressure section is a section having a static pressure lower than a static pressure in the condenser.

9. The method of operating the air purge device according to claim 8, wherein the low-pressure section is located upstream of a diffuser part of a compressor.

10. The method of operating the air purge device according to claim 8, wherein the low-pressure section is a section in which a flow rate of a refrigerant gas is accelerated in the refrigerant channel.

11. The method of operating the air purge device according to claim 1, wherein the air purge pipe is connected to an evaporator.

12. The method of operating the air purge device according to claim 1, wherein the separation film is shaped in a cylinder, the air purge device further comprising:
a film heating unit configured to heat a mixed gas present inside the cylinder.

13. The method of operating the air purge device according to claim 12, wherein the film heating unit is a heater configured to electrically generate heat.

14. The method of operating the air purge device according to claim 12, wherein the film heating unit is a tube through which a high-temperature refrigerant ejected from a compressor flows.

15. A air purge device comprising:
an air purge pipe connected to a condenser and configured to extract a mixed gas containing a refrigerant gas and an uncondensable gas from the condenser;
a separation film provided to the air purge pipe and configured to separate, by a pressure difference, an uncondensable gas from the mixed gas extracted by the air purge pipe;
an exhaust pipe configured to externally guide a gas containing the uncondensable gas separated by the separation film;
a vacuum pump provided to the exhaust pipe and configured to externally discharge a gas present inside the exhaust pipe; and
a pipe heating unit configured to heat a mixed gas present inside the air purge pipe upstream of the separation film.

16. The air purge device according to claim 15, wherein the separation film is shaped in a cylinder, the air purge device further comprising:
a film heating unit configured to heat a mixed gas present inside the cylinder.

17. A air purge device comprising:
an air purge pipe connected to a condenser and configured to extract a mixed gas containing a refrigerant gas and an uncondensable gas from the condenser;

a separation film provided to the air purge pipe and configured to separate, by a pressure difference, an uncondensable gas from the mixed gas extracted by the air purge pipe;

an exhaust pipe configured to externally guide a gas containing the uncondensable gas separated by the separation film; and a vacuum pump provided to the exhaust pipe and configured to externally discharge a gas present inside the exhaust pipe, wherein the separation film is shaped in a cylinder, the air purge device further comprising:

a film heating unit configured to heat a mixed gas present inside the cylinder.

18. A method of an air purge device, wherein the air purge device includes:

an air purge pipe connected to a condenser and configured to extract a mixed gas containing a refrigerant gas and an uncondensable gas from the condenser;

a separation film provided to the air purge pipe and configured to separate, by a pressure difference, an uncondensable gas from the mixed gas extracted by the air purge pipe;

an exhaust pipe configured to externally guide a gas containing the uncondensable gas separated by the separation film;

a vacuum pump provided to the exhaust pipe and configured to externally discharge a gas present inside the exhaust pipe; and a pipe heating unit configured to heat a mixed gas present inside the air purge pipe upstream of the separation film, the method comprising:

adjusting an amount of heat generation of the pipe heating unit and/or the film heating unit based on a temperature difference between a cooling medium temperature at a cooling medium outlet of the condenser and a saturated temperature of the condenser.

19. The method of operating the air purge device according to claim 18, method further comprising:

increasing the amount of heat generation of the pipe heating unit and/or the film heating unit when an increase degree of a temperature difference defined by the saturated temperature of the condenser minus a cooling medium temperature at the cooling medium outlet of the condenser exceeds 1 K.

20. The method of operating the air purge device according to claim 18, the method further comprising:

reducing the amount of heat generation of the pipe heating unit and/or the film heating unit or does not cause the pipe heating unit and/or the film heating unit to generate heat when an increase degree of a temperature difference defined by the saturated temperature of the condenser minus a cooling medium temperature at the cooling medium outlet of the condenser is less than or equal to 0.5 K.

21. The method of operating the air purge device according to claim 18, the method further comprising:

adjusting the amount of heat generation of the pipe heating unit and/or the film heating unit so that a gas temperature in the air purge pipe downstream of the separation film falls within a predetermined temperature range.

* * * * *